(12) United States Patent
Satoh et al.

(10) Patent No.: US 6,437,686 B2
(45) Date of Patent: Aug. 20, 2002

(54) SYSTEM FOR MONITORING AIRPORT EQUIPMENTS UTILIZING POWER-LINE CARRIER

(75) Inventors: Takakazu Satoh, Fuchu; Hidenori Gotoh, Matsudo, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/768,302

(22) Filed: Jan. 25, 2001

(30) Foreign Application Priority Data

Jan. 27, 2000 (JP) .................................... 2000-018892
Jun. 9, 2000 (JP) .................................... 2000-174059

(51) Int. Cl.$^7$ .................................................. H04M 11/04
(52) U.S. Cl. ........................ 340/310.01; 340/310.02; 340/310.03; 340/310.04; 340/310.06; 340/310.07
(58) Field of Search ................ 340/310.01, 310.03, 340/310.04, 310.06, 310.07, 538, 310.02; 375/259, 258

(56) References Cited

U.S. PATENT DOCUMENTS

| 4,446,458 A | * | 5/1984 | Cook ..................... 340/310.01 |
| 4,751,604 A | * | 6/1988 | Wilkinson ..................... 361/68 |
| 4,804,938 A | * | 2/1989 | Rouse et al. ........... 340/310.01 |
| 5,452,344 A | * | 9/1995 | Larson .................. 340/310.01 |
| 5,638,057 A | | 6/1997 | Williams .................... 340/947 |

* cited by examiner

Primary Examiner—Jeffery Hofsass
Assistant Examiner—Daniel Previl
(74) Attorney, Agent, or Firm—Finnegan, Henderson, Farabow, Garrett & Dunner, L.L.P.

(57) ABSTRACT

A power-line carrier airport facilities monitor system, comprising a host station and respective terminal for monitoring individually the object facilities via a rubber transformer are connected in series to a power line derived from a fixed current generator, wherein the host station and respective terminal create a control command for respective terminal/monitoring signal of the object facilities as text data and, on the other hand, injections said text data to the power line by FSK modulation based on the zero cross detection of the power line power source waveform.

11 Claims, 16 Drawing Sheets

SYSTEM FOR MONITORING AIRPORT EQUIPMENTS UTILIZING POWER-LINE CARRIER

BACKGROUND OF THE INVENTION

This application is based upon and claims the benefit of priority from the prior Japanese Patent Application No. 2000-18892, filed Jan. 27, 2000 and No. 2000-174059, filed Jun. 9, 2000, the entire contents of which are incorporated herein by reference.

The present invention relates to an airport facilities monitor system for monitoring airport facilities such as a number of lamps, sensor or the like to be installed on runways, taxiways or the like in the airport, the airport facilities monitor system using the power-line carrier technology.

In the prior art, the airport facilities monitor system for monitoring airport facilities constituted of a number of lamps, sensor or the like to be installed in the airport using the power-line carrier technology have a host station and, respectively through a rubber transformer, terminals (slave stations) connected in series to a power line derived from a fixed current generator CCR/CCT (called fixed current generator, hereinafter) for creating and generating a fixed current from a commercial alternative current source, lamps and sensors being connected respectively to these respective terminals.

There, both the host station and respective terminal perform the host-terminal communication, by transmitting in combination 1-bit information synchronized with the cycle of the power source waveform output from the fixed current generator. In short, the host station transfers the control signal sent from a central monitoring room side which is a higher order system to respective terminal through a power line by the combination of 1-bit information, and upon reception of this information, the respective terminal control the turning ON/OFF of the lamp based on the information contents. On the other hand, the respective terminal monitors the lamp and sensor status, transfers its monitoring information to the host station through the power line by the combination of 1-bit information, while the host station is constituted to transfer the monitoring information received from respective terminals to a monitoring control panel, which is a higher order system, through LAN, to display the status of lamps and the like of respective terminals on an operator console.

By the way, in such power-line carrier monitoring control system as mentioned above, in addition to a dedicated monitoring of burnt-out lamp, nothing but a predetermined number of lamps can be monitored and controlled, because little data amount can be treated by the power-line carrier and, besides, the transfer rate is low.

On the other hand, the fixed current generator in the aforementioned monitoring and control system, is the one designed to supply the power line with power of fixed current and, more concretely, as shown in FIG. 1, adopts a method to select a current waveform S2 of high amplitude between a low amplitude current waveform S1 and the high amplitude waveform S2 through the phase control at a convenient phase angle (60 degrees for example) from the zero cross point of the low amplitude current waveform S1, using a thyristor, output a predetermined fixed current (6.6 A for example) defined beforehand to be used for lamps or other airport equipment, and supply to the power line.

Therefore, the current immediately after the phase control varies generally in a rapid rise state, presents a high frequency equal or superior to 50 Hz/60 Hz in respect of frequency, transits to a standard waveform (sinusoidal wave) of 50 Hz/60 Hz when in attains the high amplitude current waveform, but happens to be unstable immediately after this transition.

There, conventionally, in the case of transfer of a required signal using a power-line carrier, control, monitoring or other signals are transferred using the power-line carrier, by modulating them with a predetermined frequency from a power line mode which is a part of signal processing system, for the high amplitude waveform S2 at such a timing to avoid the low amplitude current waveform on the power line and rapid rise portions immediately after the phase control, and further, unstable portions during the transition to the high amplitude current waveform, namely noise producing portions.

However, the aforementioned monitoring and control system aims only to transfer the signal at an appropriate timing, noise still generates from the fixed current generator by the phase control, and under the influence of this noise, the reception sensibility of host station and respective terminal deteriorates considerably. In addition, this noise is a spike noise generated like as impulse, and moreover, it is extremely difficult to eliminate, as the noise generation point varies according to the tap position (phase control angle) adjusting the lamp brightness.

Also, in the host station and respective terminal, the control signal and monitoring signal are carried by the power line, using a power line circuit including power line, rubber transformer or the like; however impedance due to LC exists in the power line circuit, and this impedance absorbs signal carried by the power line. This is caused mainly by resonance phenomenon between the rubber transformer reactance L component and the power line and ground capacitance, and there exist abnormal attenuation points of signal carried by the power line. As the result, terminals at the position corresponding to the abnormal attenuation point drop remarkably in their reception sensibility due to the attenuation of carried signal.

Especially, in the case of power-line carrier, abnormal attenuation point is an inevitable problem, because rubber transformers constituting a number of reactance components are installed in the power line circuit. And further, the installation of rubber transformer being dependent on the lamp location in the airport, and can not be decided arbitrarily, the abnormal attenuation amount increases inconveniently according to the installation mode.

BRIEF SUMMARY OF THE INVENTION

It is an object of the present invention to provide a power-line carrier airport facilities monitor system for allowing to transfer stably host station control signal and status signal of lamp, sensor and the like of a number of terminals, and allowing to transfer effectively a quantity of data.

Another object of the present invention is to provide a monitoring control system using the power-line carrier for reducing the effect of noise produced by the fixed current generator, and also to ensure a high quality transfer, without being influenced by the power line circuit construction conditions.

To solve the aforementioned problems, the present invention relates to a power-line carrier airport facilities monitor system, wherein a host station and respective terminals for monitoring and controlling individually the object facilities such as lamp, sensor and the like respectively via a rubber transformer are connected in series to a power line derived from a fixed current generator, the host station transmitting to the respective terminal using power-line carrier based on a control signal from a higher order system, while the respective terminals transmitting the monitoring signal from the object facilities to the host station using power-line carrier, wherein the host station and terminal comprise:

zero cross detection means for detecting the zero cross of power source waveform of the power line, a data processing calculation control section for creating a control command for respective terminal/monitoring signal of the object facilities as text data, and signal insert means for inserting the text data to the power line by FSK modulation based on the zero cross detected by the zero cross detection means.

According to the invention, adopting the aforementioned configuration, it is possible to avoid the prevention magnetic saturation, the text data to be inserted into the power line is transmitted by frequency modification, and as this frequency modulation, it is transmitted by FSK modulation using two frequency modulation, allowing to transmit avoiding stationary noise generated by the fixed current generator (CCR/CCT) creating a fixed current from the commercial power source, and to realize a stable, and, appropriate power-line carrier of the text data without being affected by the noise.

Also, to solve the aforementioned problems, the present invention relates to a monitoring control system using power-line carrier, wherein a host station and respective terminals for monitoring and controlling the facilities to be monitored respectively via a rubber transformer are connected in series to a power line derived from a fixed current generator, the host station transmitting a control signal from a higher order system to the respective terminal by power-line carrier, while the respective terminals monitors the facilities to be monitored upon reception of the control signal and, at the same time, transfers a monitoring signal of this facilities to be monitored by power-line carrier, wherein a bypass filter apparatus comprises a LC resonance circuit resonating with the frequency used for the power-line carrier is provided on the output side power line of the fixed current generator, and noise generated from the fixed current generator and signal of the frequency used for the power-line carrier between the host station and each terminal are respectively separated.

The present invention, adopting the aforementioned configuration, installs a filter apparatus including a LC resonance circuit resonating the frequency used for the power-line carrier and sends noise generated from the fixed current generator to the power source generation side by the filter apparatus, and on the other hand, sends signal transmitted and received between the host station and the terminal to the host station and terminal side by means of the filter apparatus, thus separates noise and signal completely, improving the signal transfer quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Hereafter, embodiments of the present invention will be described referring to drawings.

Figure 1:
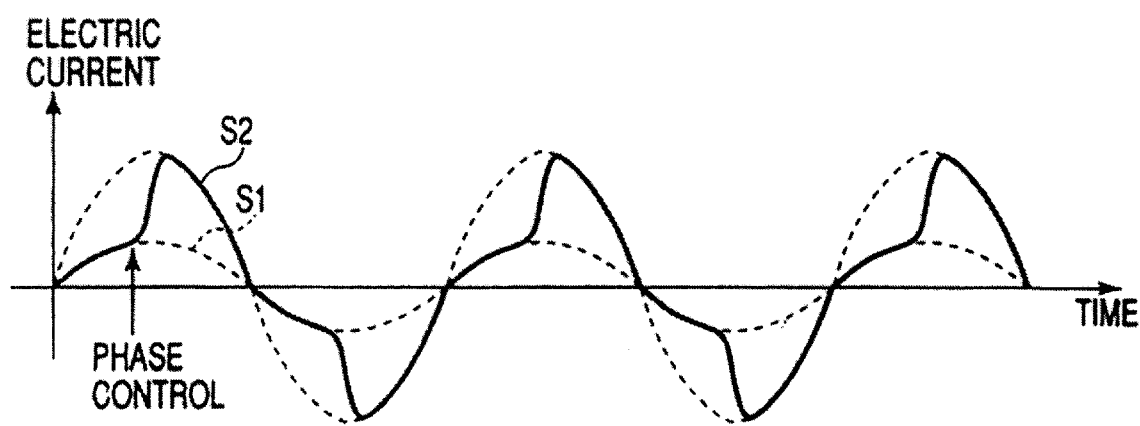
FIG. 1 is a diagram illustrating an example of power source waveform changeover by phase control by a fixed current generator.
Figure 2:
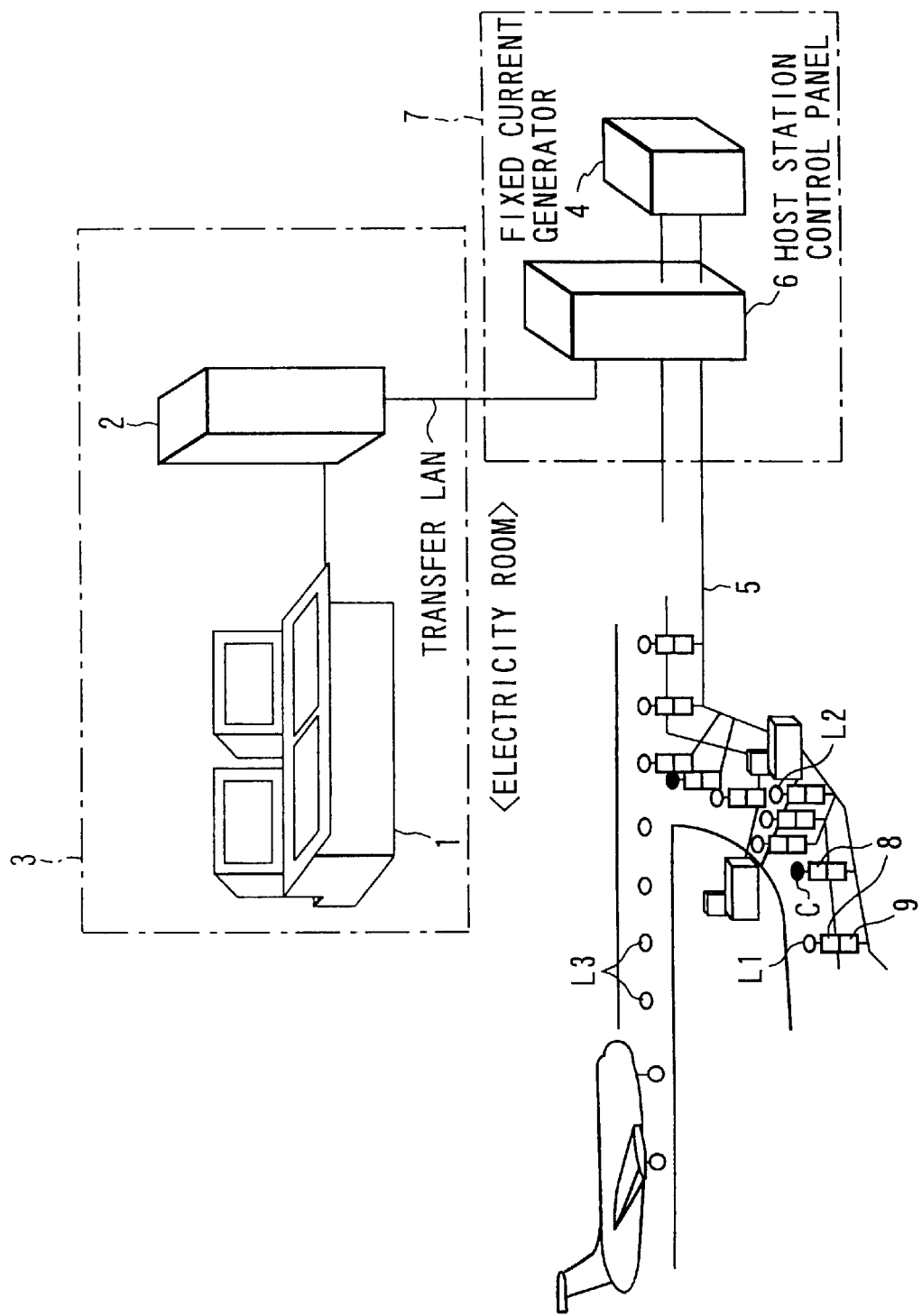
FIG. 2 is a general configuration example diagram of the power-line carrier airport facilities monitor system according to the present invention.

FIG. 2 is a general configuration diagram showing an example of the power-line carrier airport facilities monitor system according to the present invention.

This airport facilities monitor system comprises a central monitoring room (called higher order system, hereinafter) 3 including an operator console 1 performing the operation status display of taxiway central line lamp L1, stop bar light L2, runway lamp L3 (collectively called lamp L, hereinafter) sensors C or the like, turning on/off control of lamp L, operation test of respective terminal, reset or other operation of respective terminal, and a monitoring control panel 2 or the like connected to this console 1 via a control LAN, and mutually transmits and receives signal to and from the operator console 1, a host station 7 including a fixed current generator 4 such as CR/CCT which is a fixed current generator for creating and outputting a fixed current from a commercial alternative power source, and a host station control panel 6 connected to a power line 5 derived from this generator 4 via a transformer for collecting the operation status of various lamps L and monitor signals that are signals of various other sensors C informing the higher order system 3 of them, or transmitting control signal from the higher order system 3 to respective terminal 8 via the power line 5, and respective terminals (slave stations) 8 connected similarly to the power line 5 in series via a rubber transformer 9 respectively, for monitoring individually the status of respective lamp L or sensor C and controlling turning on/off of the lamp L.

Besides, the monitoring control panel 2 is the one managing collectively various power line circuit information, is connected to the transfer host station 7 supervising a single power source circuit via a transfer LAN, and has a function to own individual power line circuit information jointly with the transfer host station 7.

Figure 3:
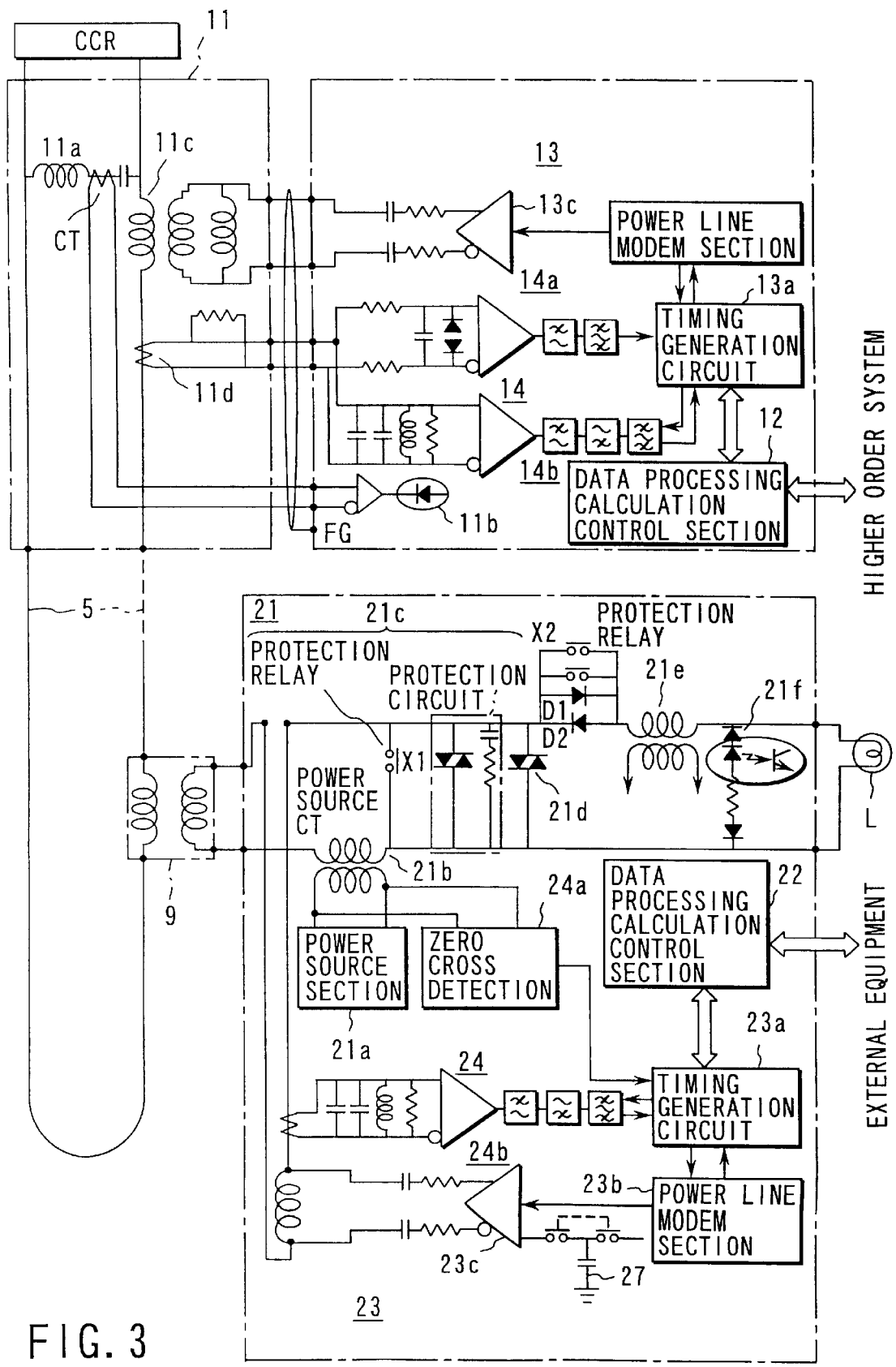
FIG. 3 is a configuration diagram showing an embodiment of the host station and respective terminal, in the power-line carrier airport facilities monitor system according to the present invention.

FIG. 3 shows a concrete configuration diagram showing a transfer host station 7 and a single terminal 8 connected in series to a power source apparatus which is an airport illumination system derived from a fixed current generator 4 and a power line 5 serving as communication media in charge of power-line carrier. It goes without saying that a number of terminals 8 are connected to the power line 5.

Namely, a host station control panel 6 of the host station 7 and, a number of terminals 8 individually via a respective transformer 9 are connected to the output side of the fixed current generator 4, as mentioned above.

This host station control panel 6 comprises a filter unit 11, a data processing calculation control section 12, a signal injection section 13 for transmitting control signal to respective terminal 8, a signal extraction section 14 for receiving operation status signal of the lamp L, sensor C and the like.

The filter unit 11 comprises, a bypass filter 11a of LC resonance circuit constituted of a coil L and a capacitor C, for preventing harmonic noise from the fixed current generator 4 from entering the host station control panel 6, respective terminal 8 side and for cutting a specific frequency used for the power-line carrier output from the host station control panel 6, respective terminal 8 side and preventing from entering the fixed current generator 4, a bypass filter status confirmation circuit for displaying for instance on a LED display element 11b the current flowing state through a current detection sensor current transformer CT, a host station dedicated CT11c for injecting information concerning the control from the higher order system 3 to the power line 5 based on the zero cross detection timing of the power source waveform of the fixed current generator 4, and a extraction current transformer 11d for extracting the monitoring signal representing the status of the lamp L, and sensor C of the terminal 8 from the power line 5, or the like.

The data processing calculation control section 12 has a function to create a text data based on the control signal for respective terminal transferred from the higher order system 3, and to transfer the monitoring information from the respective terminal to the higher order system.

The signal injection section 13 comprises a timing generation circuit 13a for taking in and outputting the text data created by the data processing calculation control section 12 at a predetermined timing after the zero cross detection of the power source waveform output from the fixed current generator 4, a power line modem 13b for transmitting the text data by two specific frequencies submitted to the frequency shift modulation (FSK) according to the timing from this timing generation circuit 13a, and a transmission amplification element 13c for amplifying data output from this power line modem 13b and injecting in the power line 5 through the host station dedicated CT11c.

The signal extraction section 14 comprises zero cross detection means 14a for detecting zero cross of the power source waveform from the extraction current transformer 11d through a passive filter, a reception amplification element and an active filter, and signal detection means 14db including a timing generation circuit 13a for taking in the text data extracted from the extraction current transformer 11d similarly through the passive filter, the reception amplification element and the active filter at a predetermined timing after the zero cross detection of the power source waveform output by the zero cross detection means 14a.

Next, the respective terminal 8 is connected between the rubber transformer 8 connected to the power line and the lamp L/sensor C, and constituted of various forms, such as being connected only to the lamp L, or connected only to the sensor C, further connected to the lam L and the sensor C, according to its application.

The respective terminal 8 comprises a lamp power source system 21, a data processing calculation control section 22 constituted of a CPU for creating a text data by taking in the status and lamp L and the like connected to this lamp power source system 21 and the other necessary signals, controlling the lamp L based on the text data received from the host station 7 through the power line 5, and further performing necessary processing according to the command from an external equipment or input equipment, a signal injection section 23, and a signal extraction section 24.

The lamp power source system 22 comprises a power source section 21a, a transformer 21b for taking out power supply for the operation of its own terminal, various protection circuit 21c for protecting the lamp L, an ON/OFF control section 21d such as triac for controlling the light-off, a current detection section 21e for detecting an overcurrent, a burnt-off lamp detection circuit 21 f for detecting a burnt-out lamp L and the like, and these detection signals are sent to the data processing calculation control section 22.

The signal injection section 23 comprises a timing generation circuit 23a for taking in and outputting the text data created by the data processing calculation control section 12 at a predetermined timing after the zero cross detection of the power source waveform output from the fixed current generator 4, a power line model {modem?} 23b for transmitting the text data by two specific frequencies submitted to the frequency shift modulation (FSK) according to the timing from this timing generation circuit 13a, and a transmission amplification element 23c for amplifying data output from this power line modem 23b and injecting in the power line 5.

The signal extraction section 24 comprises zero cross detection means 24a including a timing generation circuit 23a for detecting zero cross of the power source waveform output from the fixed current generator 4, and signal detection means 24 including a timing generation circuit 23a and a data processing calculation control section 111 has a function to receive a control signal for respective terminal 109 transferred from the higher order system 103, to create text data in addition to a passive filter, a reception amplification element and an active filter such as low pass, band pass or the like.

In addition, as a number of terminal 8 are connected to a power line 5 derived from a single fixed current generator 4, the signal attenuates more, the longer is the distance of this total power line 5, and the higher is the number of terminals. The signal output level can be increased to extend the signal range distance; however, it is not allowed to consume much power for the terminal signal output, because the power source capacity of the airport illumination equipment is limited. There, as for the signal injection method of respective terminal, the apparent power source consumption can be reduced by accumulating power out from a power source section 21b beforehand while waiting for signal insertion in a power accumulation element 27, and supplying power accumulated in the power accumulation element 27 during the signal insertion and transmission.

Besides, the filter unit 11 comprises a bypass filter which is a resonance circuit of coil and capacitor, and a bypass status confirmation circuit, and in this bypass status confirmation circuit, as high voltage is accumulated in a capacitor C of the bypass filter, it becomes possible to take measures for the security by displaying the status of this bypass filer on a display element 11b and informing the higher order system 3.

Next, the outline of data communication will be described referring to FIG. 4, before explaining the operation of the aforementioned system.

First, in the higher order system 3, the monitoring control panel 2 receives monitoring signal representing the status of lamp L and sensor C transferred from the host station 7, transmits to the operator console 1, and displays the operation status of lamps or the like. In addition, the console 1 of the higher order system 3 inputs necessary control commands from an operator, sends controls signals for on/off control of the lamp L, operation test of respective terminal, reset of respective terminal or the like to the respective terminal 8 through the monitoring control panel 2 and the host station 7, and the operator console 1 monitors collectively the response status of this terminal side, and, performs the control.

Normally, one host station 7 is connected to one fixed current generator, and the host station control panel 6 transmits and receives signals with the higher order system 3/respective terminal 8, and transmits signal to the requiring higher order system/lower order terminal 8.

Figure 4:
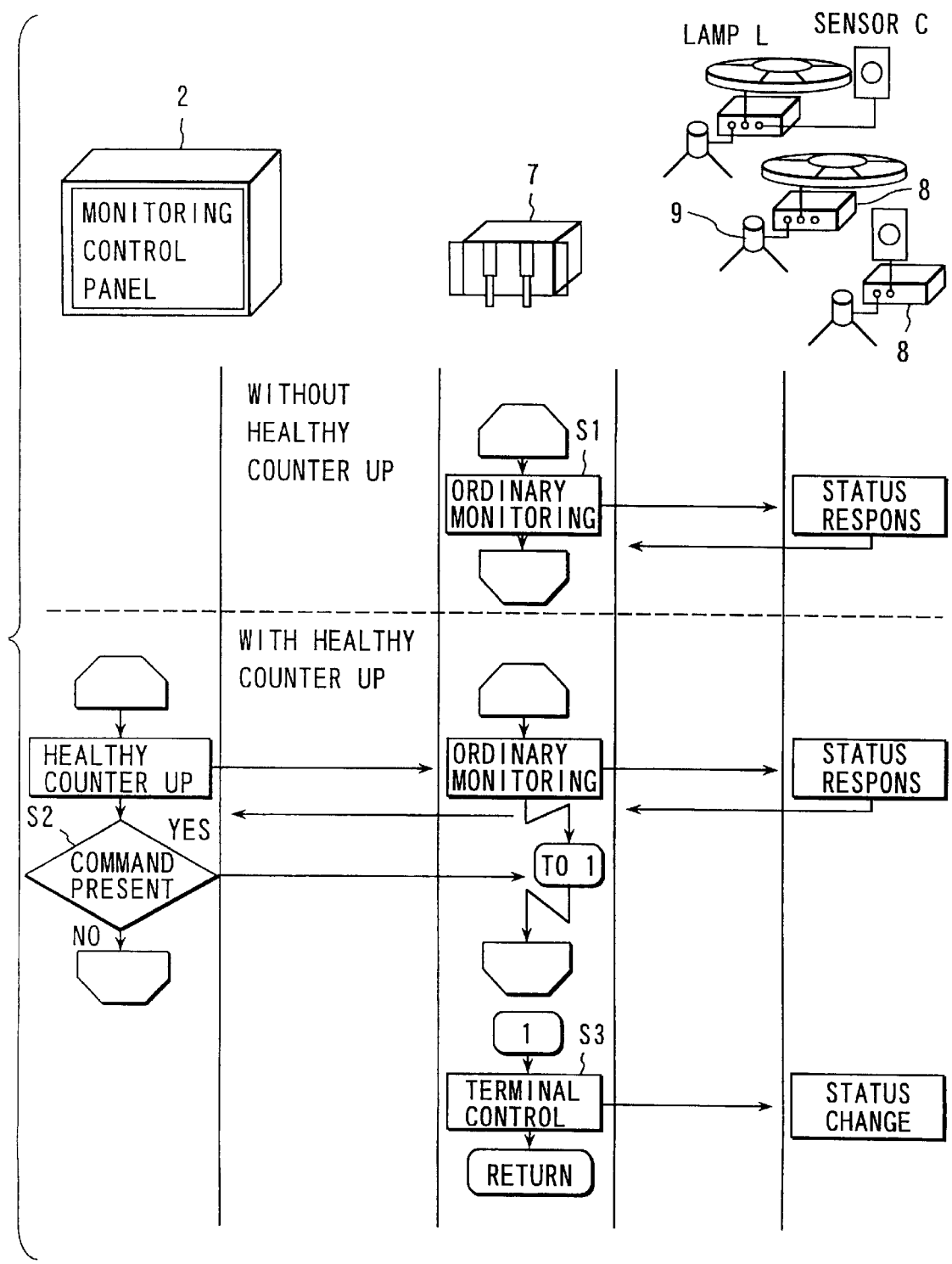
FIG. 4 illustrates an example of communication of the whole system.

In short, a mutual and ordinary monitoring is performed (S1) as shown in FIG. 4, between the host station 7 and the respective terminal 8, and the monitoring control panel 2 acquires data from the host station control panel 6 when the host station is normal (healthy counter UP).

Besides, the host station control panel 6 suspends temporarily the control, upon reception of a control command (S2) from the higher order system 3 during the ordinary monitoring with the respective terminal 8, perform the terminal control by interruption to the respective terminal 8 (S3) and sustains the ordinary monitoring after performing this control.

Figure 5:
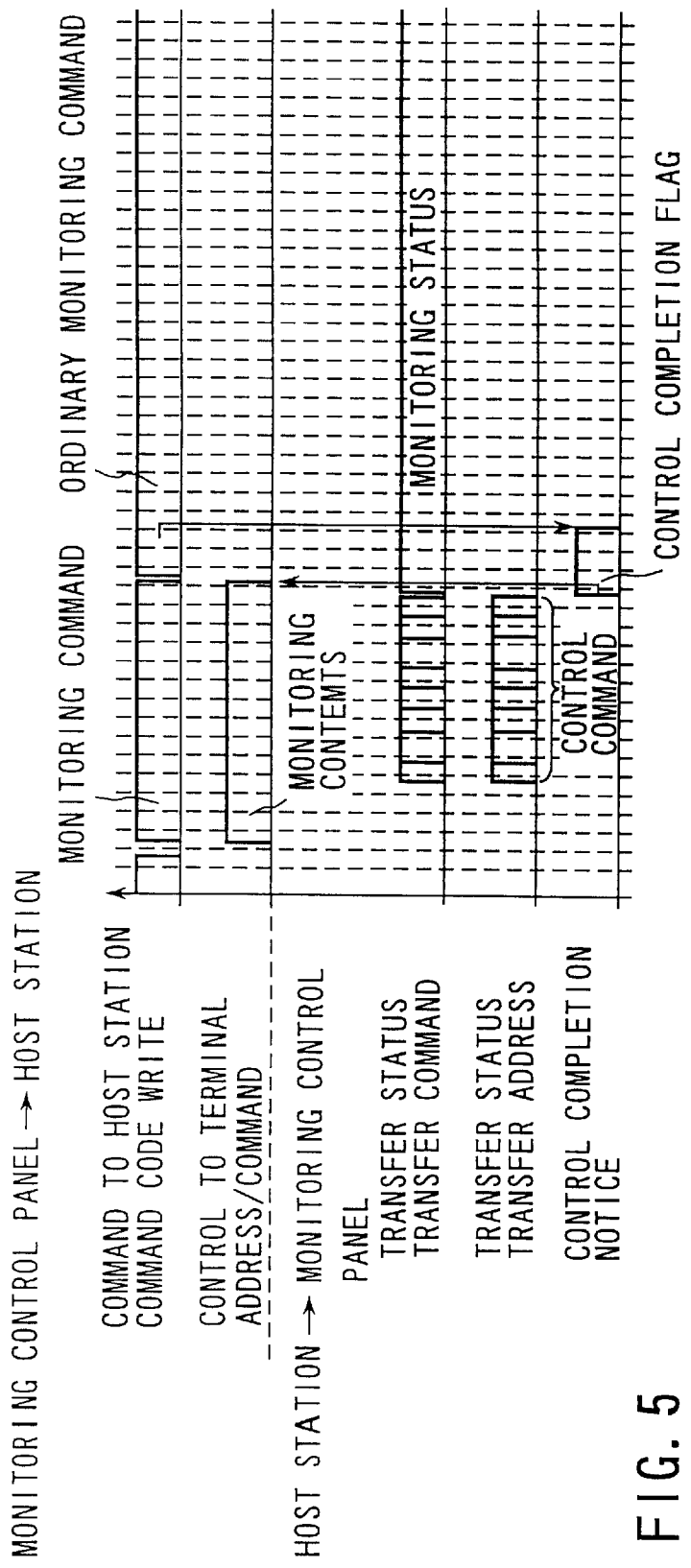
FIG. 5 illustrates the signal delivery between a monitoring control panel of a higher order system and the host station.

The communication between the monitoring control panel 2 and the host station 7 is performed according to the procedures as shown, for example, in FIG. 5. In short, the monitoring control panel 2 and the host station 7 are provided with a transfer area such as monitoring control panel area (upper stage) or host station area (lower state), and has a mechanism to output control commands each time it is necessary.

In other words, ordinarily, as monitoring commands are written in the communication from the monitoring control panel 7 shown in the upper stage to the host station 7, the host station monitors the respective terminal 8, . . . based on this ordinary monitoring command, collects the monitoring status of respective terminal, and stores in a necessary memory area.

In this state, the monitoring control panel 7, when a control is required, writes a control command code as command to the host station 7, and, writes control contents such as necessary terminal address or command (request contents) and the like.

Here, as shown in the lower stage of the same drawing, the host station 7 sequentially performs the command control contents under the sequential terminal address, to the respective terminal, based on the command from the monitoring control panel 2. There, after the execution of the control contents to the respective terminal, a control completion flag is set, and on the other hand, the monitoring control panel 2 is informed of this control completion. Here, the monitoring control panel 2, sets to the ordinary monitoring state by writing again an ordinary monitoring command to the host station 7, and erases the control completion flag.

By the way, on the host station 7 side, as shown in FIG. 3, a current detection current transformer CT is disposed between a coil L-capacitor C of the bypass filter 11a for avoiding mutual imprecations of harmonic noise generated from the fixed current generator 4 side and power line carrier superposed on the power line 5 from the terminal side or the like, the operation status of the bypass filter 11a can be monitored at all times by connecting a LED display element 11b to this current transformer CT. In short, when the bypass filer 11a is normal, the display elements 11 repeats the blinking according to the commercial frequency 50/60 Hz output from the fixed current generator 4, when charge remains in the capacitor C of the filter 11a, the display element 11b continues to emit light, and on the other hand, when the capacitor C is abnormal, the display element 11b is extinguished.

Now, electric shock or other accidents can be prevented beforehand and exhaustively and it is effect for measures in respect of the security to inform the higher order system 3 of abnormality information by artificially monitoring the display information of the display element 11b, or monitoring by taking in the data processing calculation control section 12.

Figure 6:
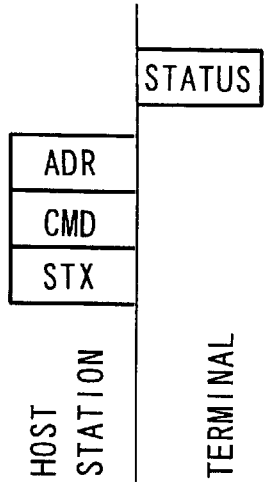
FIG. 6 illustrated a signal delivery area of the host station and the respective terminal.

Further, the communication between the host station 7 and the respective terminal 8 shall be a method wherein the host station 7 is set as primary station, to perform the communication to the respective terminal 8. In case of monitoring at all times, as shown in FIG. 6, it is so constituted to allocate 3-byte information constituted of start STX, command CMD and address ADR from the host station 7 to the terminal 8, and to allocate 1 byte to the status information of lamp, sensor, its own terminal information or the like from the terminal 7 to the host station 8.

Besides, in this method, a simultaneous control of a plurality of terminals 8, ... is made possible and the data transfer effectiveness is secured by performing host station 7→terminal 8 one-way communication for control commands such as turning on/off of the lamp L, and further, by including a group designation address in the address ADR.

Figure 7:
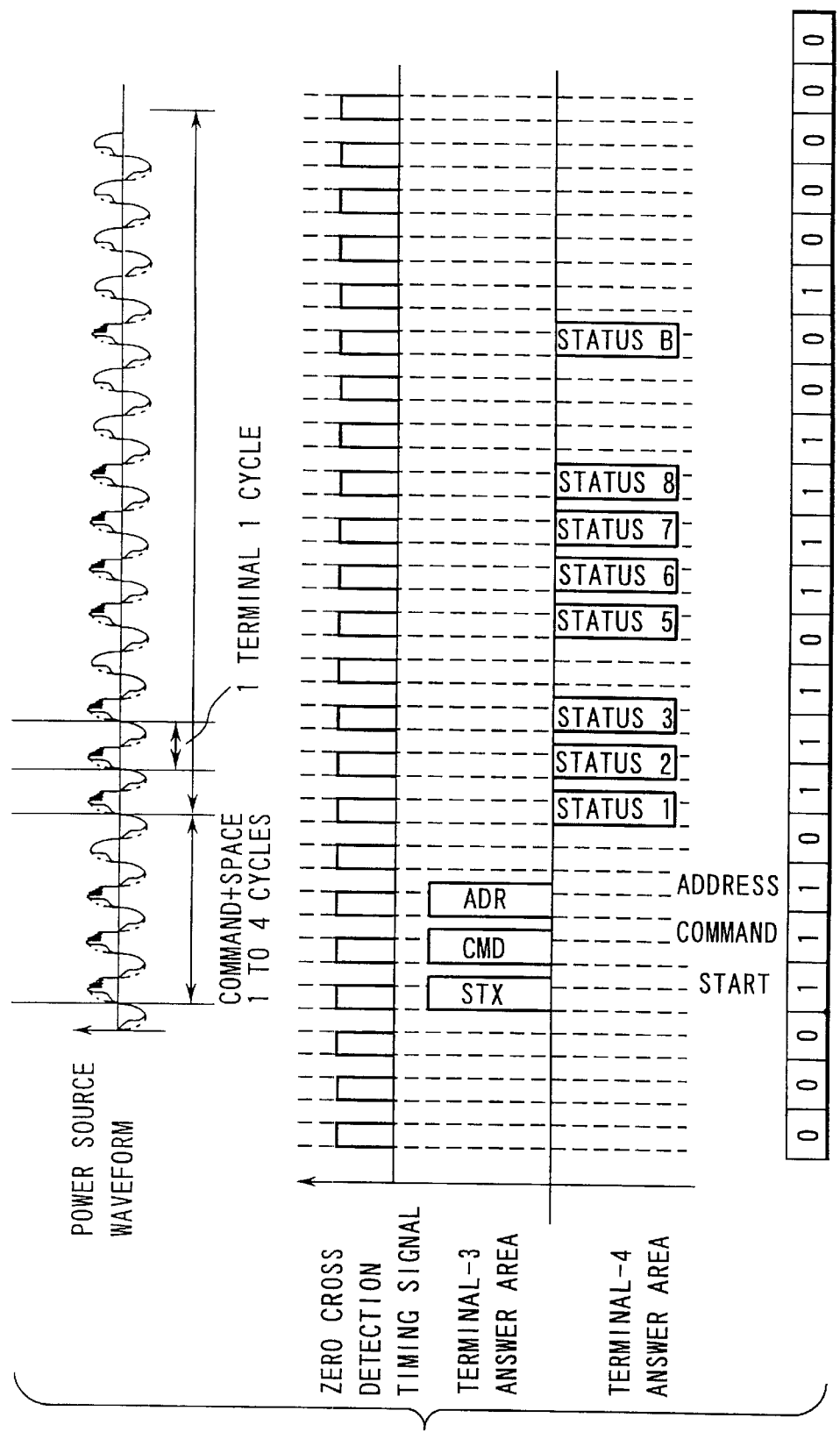
FIG. 7 is a diagram showing the signal allocation of the host station and the respective terminals for waveform.

FIG. 7 is a drawing illustrating an example of information allocation for the power source waveform for reducing the monitoring interval, and increasing the monitoring efficiency.

In this example, when the host station 7 generates a control command, the zero cross is detected by zero cross detection means 14*a* for each half cycle/1 cycle of the power source waveform of the power line 5 taken out from a current detection sensor current transformer l*id*, and this detection timing signal is sent to a timing generation circuit 13*a*.

At this time, as 3-byte information constituted of start STX, command CMD and address ADR is created in the data processing calculation control section 12 upon reception of the higher order system 3 or the like, as shown in FIG. 6, start STX, command CMD and address ADR are taken in for respective zero cross detection timing signal, and injected sequentially into the power line 5, through frequency shift modulation (FSK) by a power line modem section 13*b*.

At this time, in the case when the address ADR includes, for instance, an address of simultaneous control command of a plurality of necessary terminals 8, these terminals 8 extracts sequentially 3-byte information from the host station 7 received by the timing generation circuit 23*a* through the signal detection means 24*b*, based on the zero cross timing signal generated each time when the zero cross detection means 24*a* detects a zero cross, and sends to the data processing calculation control section 22. Here, the data processing calculation control section 22, in case of judging that it relates to its own terminal from the received address, creates and outputs the status of the concerned terminal corresponding to the command contents in text data format, then the timing generation circuit 23*a* sends the text data to the power line modem section 23*b*, based on the zero cross detection timing signal from the fifth cycle predetermined for each terminal, after the detection of start STX, and injects into the power line 5 by frequency shift modulation (FSK).

At this time, the host station 7 prepares a buffer area for each cycle, counts power source waveform zero crosses after the transmission of start STX, provides an answer area of respective terminal for the fifth cycle and thereafter, judges the presence of status signal from respective terminal, sets "1" to the corresponding bit area in the buffer in case of status signal presence, receives sequentially text data from respective terminal 8, and stores sequentially for instance in another reception area of the buffer. This text data is acquired as respective terminal status information based on the turn of "1" in the order of bit in the buffer, and transferred to the higher order system 3. Besides, the lowest stage of the same drawing shows data presence/absence status in the buffer.

Figure 8:
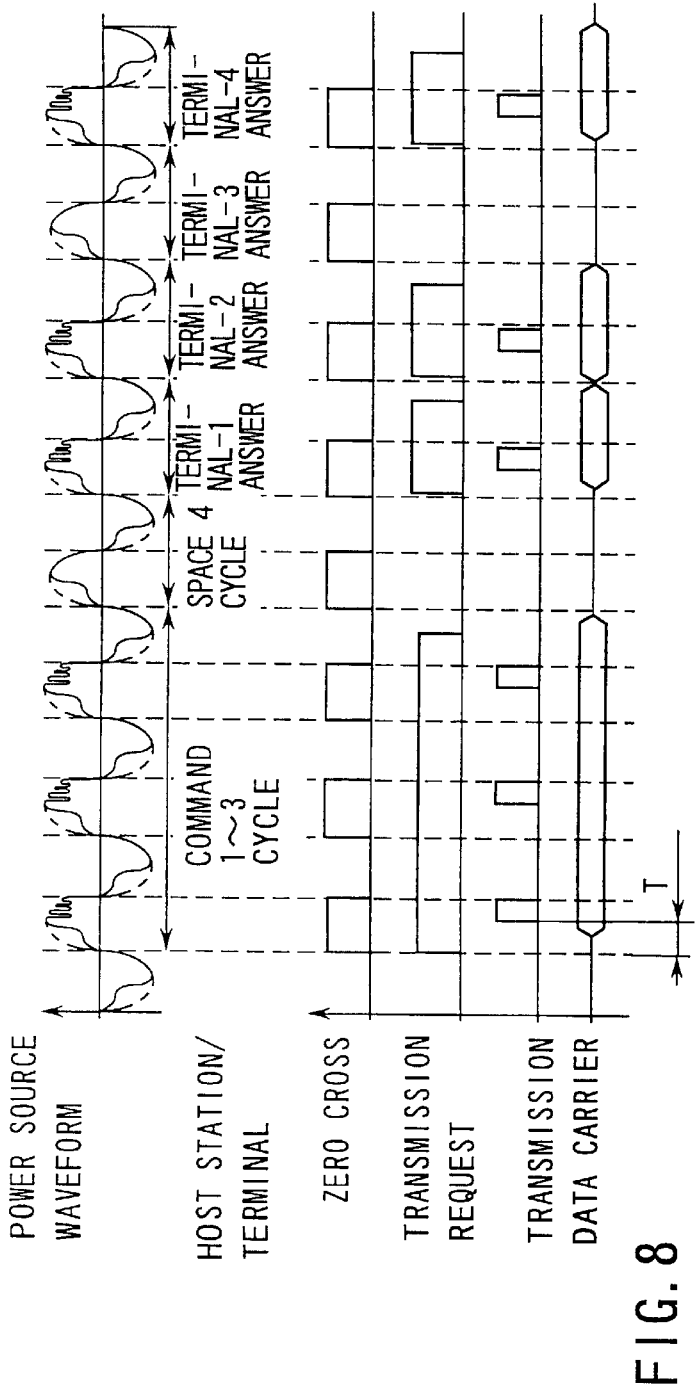
FIG. 8 is a time chart illustrating the signal insertion of the host station and the respective terminal avoiding noise of waveform.

FIG. 8 illustrates the signal injection timing from the host station 7 and respective terminal 8.

Figure 9:
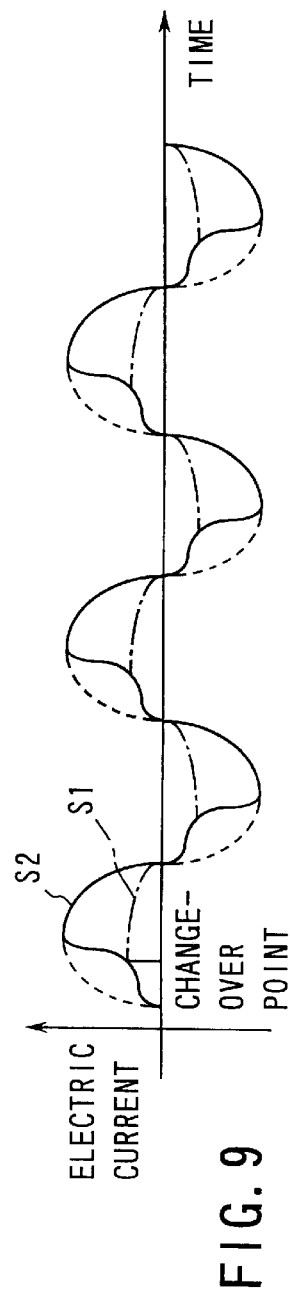
FIG. 9 is a diagram illustrating the cause of noise generation in the waveform.

Ordinarily, the fixed current generator 4 is the one to supply the power line 5 with a fixed current power, and more specifically as shown in FIG. 9, is the one for outputting a fixed current of, for instance 6.6 A determined beforehand to be used for the airport facilities, by changing over to and selecting a high amplitude current waveform S2 at the changeover point of a predetermined phase angle, for instance 60 degrees, from the zero cross point of a low amplitude current waveform S1, using a thyristor, between the low amplitude current waveform S1 and the high amplitude current waveform S2, resulting in noise generation in the proximity of the changeover point.

There, when the host station 7/respective terminal 8 inject signal into the power line 5, in order to avoid noise generated from the fixed current generator 4, they inject signal, at a timing sufficiently remote from the changeover point within the power source waveform cycle shown in FIG. 8, in short, after an interval of a predetermined period of time T from the zero cross.

To be more specific, both host station 7/respective terminal 8 detect the power source waveform zero cross by the zero cross detection means 14*a*/24*a*, and the data processing calculation control section 12 of the host station 7 inserts 3-byte information text data to the power line 5 through the power line modem section 13*b* within the transmission request period under the control command from the higher order system 3, and at this time, 3-byte information made as text data is sequentially inserted and transmitted by the power line modem section 13*b*, when a predetermined time T has elapsed from the zero cross by the timing generation circuit 13*a*.

The respective terminal 8 also, similarly, counts the power source waveform zero cross, after the reception of start STX, provides an answer area of respective terminal for the fifth cycle and thereafter, and also, when a predetermined time T has elapsed after the zero cross detection by the timing generation circuit 23*a*, 1-byte information which is status information of lamp or the like made as text data is inserted into the power line 5 through the power line modem section 23*b* and transmitted.

Consequently, according to the aforementioned embodiment, as the text data to be inserted into the power line is transmitted by FSK modulation using two frequencies, the transmission can be performed avoiding stationary noise generated from the fixed current generator 4, allowing a stable, and appropriate text data power-line carrier without being affected by noise.

In addition, the signal insertion section 13, 23 transmits text data avoiding the point where noise is generated from the fixed current generator 4 in a predetermined cycle as shown in FIG. 8, allowing to improve the transfer quality, and eventually, enhance the signal detection accuracy of the other party.

Further, the host station creates 3-byte text data based on the control signal and inserts into the power line 5 using power source waveform zero cross of a plurality of cycles as shown in FIG. 7, and on the other hand, the respective terminal 8 creates 1-byte text data, namely monitoring signal of the object equipment, and inserts into the power line 5 using power source waveform zero cross of a predetermined cycle, permitting to transfer a quantity of data even when a low transfer rate power line modem is used.

Moreover, the host station 7 monitors the status of the bypass filter 11*a*, by disposing a display element 11*b* on the bypass filter 11*a* installed between power lines through a current transformer CT, allowing to prevent electric shock or other accident beforehand, by informing the higher order system 3 of the bypass filter abnormality. Further, the respective terminal 8, being provided with a power accumulation element 27 for accumulating power of the power source section 21*a* of the lamp L, permits to use effectively the power accumulated while waiting signal insertion for signal insertion, and to intend to reduce the power consumption.

As mentioned above, the present invention converts host station control signal and status signal of monitored equipment of a number of terminals into a text data, and at the same time, transfers by a specific frequency or, further transfer the text data all the way avoiding noise, resulting in a stable transfer free from noise influence.

In addition, according to the present invention, the host station transfers several bytes of text data over a plurality of cycles of the power source waveform, while the respective terminal transfer sequentially to the host station 1-byte text data for every 1 cycle of a predetermined waveform, allowing to transfer effectively a quantity of data concerning the monitoring control.

Next, another embodiment of the present invention will be described referring to FIG. 10.

Figure 10:
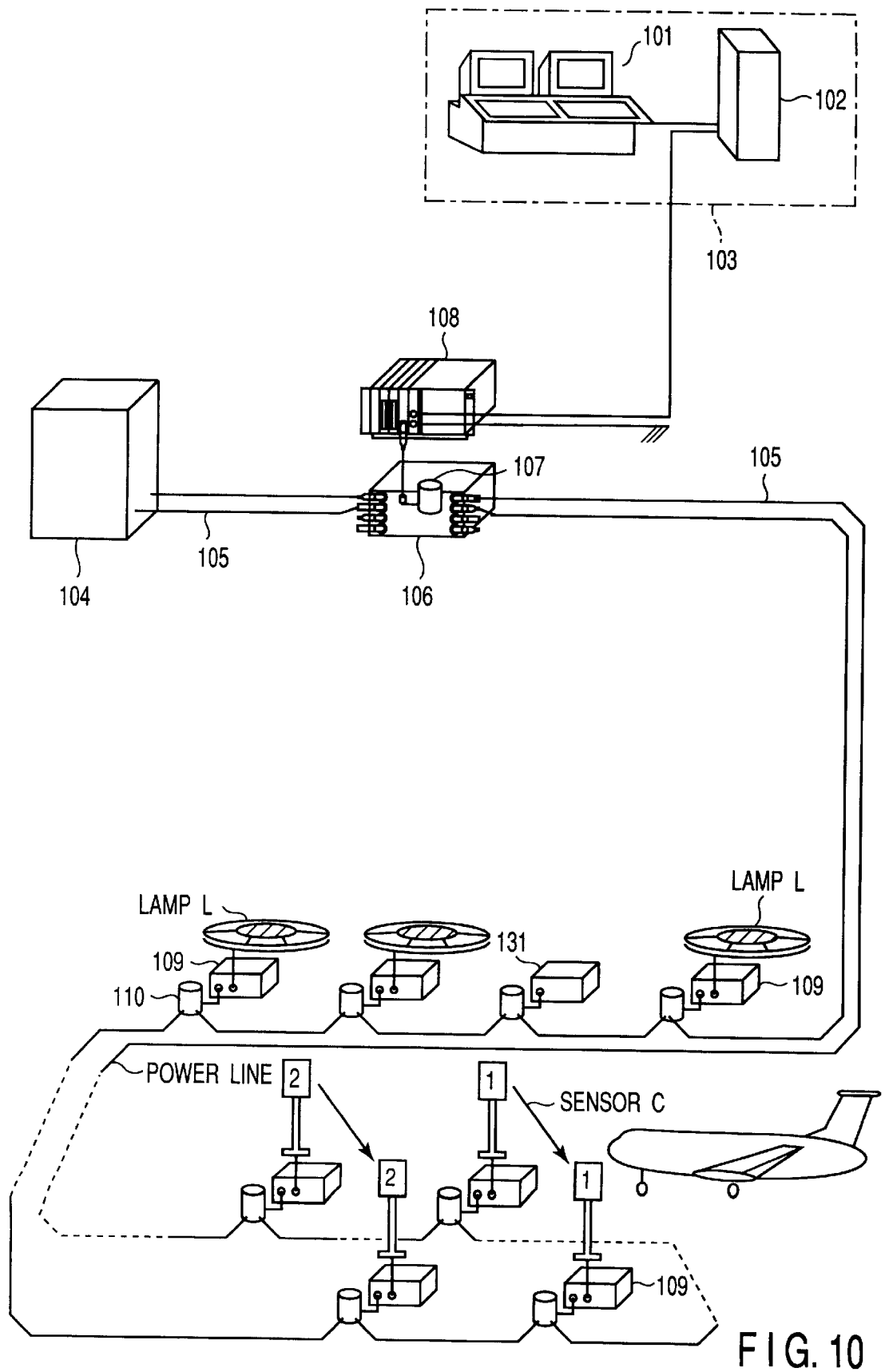
FIG. 10 is a general configuration diagram showing an example of airport lamp monitor system according to the present invention.
Figure 11:
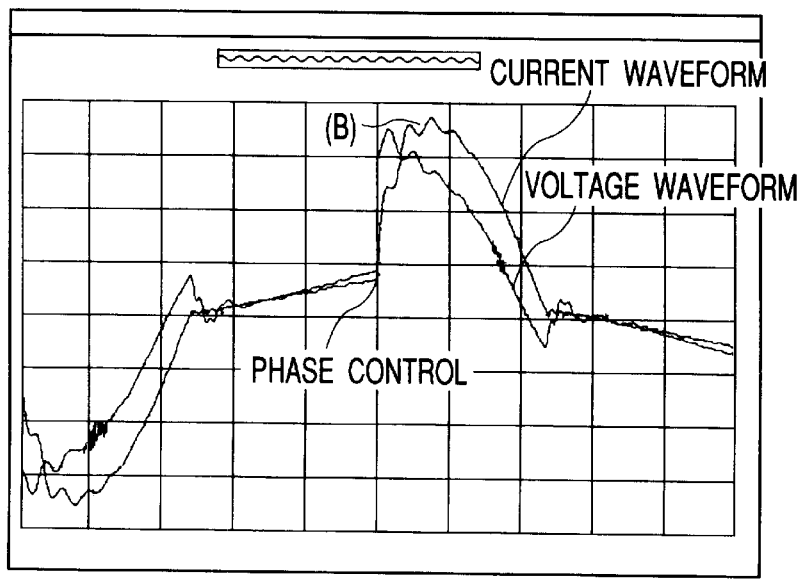
FIG. 11 is a diagram showing the noise generation state of the power source waveform generated from the fixed current generator.

FIG. 10 is a general configuration diagram showing an example of the power-line carrier airport facilities monitor system according to the present invention. This monitor control system comprises various lamps L as equipment in the airport, a central monitoring room (hereinafter, called higher order system) 103 including an operator console 101 performing the operation state display of sensors C or the like, control of lamp L turning ON/OFF, operation test of respective terminal, reset or other operation of respective terminal, and a monitoring control panel 102 or the like connected to this console 101 via a control LAN, and mutually transmits and receives signal to and from the operator console 101, and the like, a fixed current generator (CCR) 104 generating and outputting a fixed current from a commercial alternative power source, a filter apparatus 106 having a bypass filter function provided at a position relatively near {near} the output side of the fixed current generator 104 among power lines 105 derived from this fixed current generator 104, a host station 108 connected from this filter apparatus 106 via a host station dedicated transformer (current injection/extraction sensor) 107 for collecting the operation state of various lamps L, . . . and monitor signals that are signals of various other sensors C, informing the higher order system of them, or transmitting control signal from the higher order system 103 to respective terminal 109 via the power line 105, and respective terminals (slave stations) 109 connected to the power line 105 in series via a rubber transformer 110 respectively, for monitoring individually the state of respective lamps L or sensor C and executing the control of lamp L ON/OFF upon the reception of control signal from the host station side.

Besides, the monitoring control panel 102 is the one managing collectively various signals concerning various power line circuits, is connected to the host station 108 supervising a single power source circuit 104 via a transfer LAN, and has a function to own individual power line circuit signal jointly with the transfer host station 108.

Figure 15:
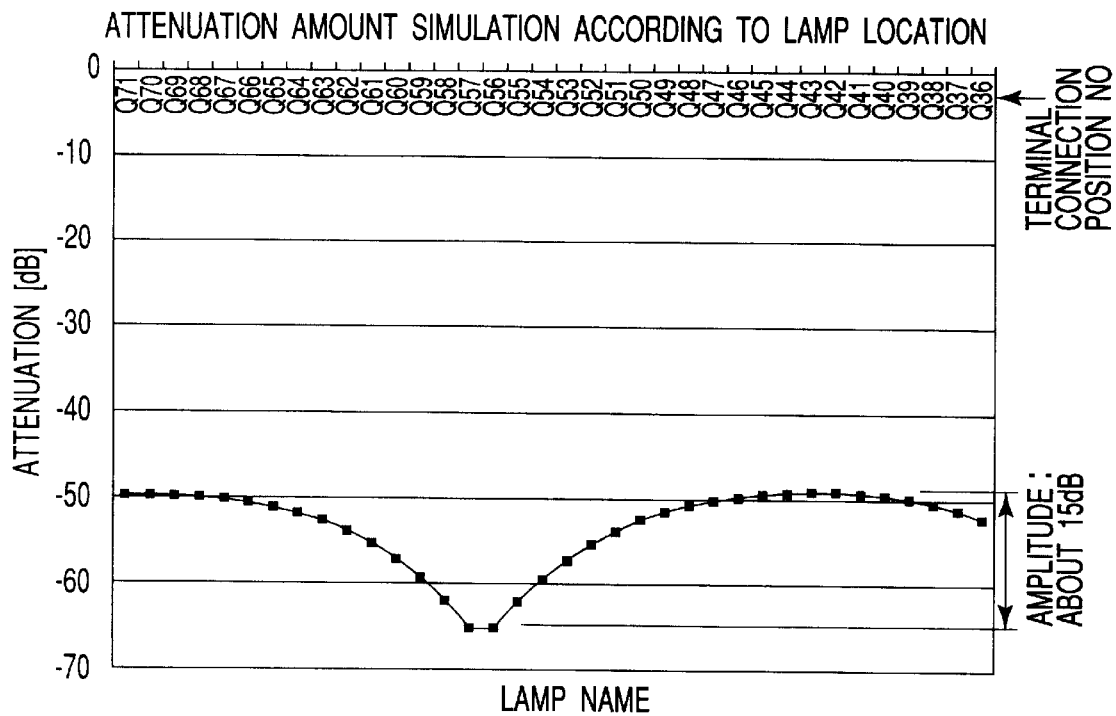
FIG. 15 is a diagram illustrating the reception level depression due to phasing, standing wave at respective terminal connection position.

The fixed current generator 104 adjusts the brightness of the lamp L by changing the total current value through the phase control as a convenient phase angle as shown in FIG. 15, using a thyristor (not shown). The phase angle for this phase control is changed to approach 0 degree side brighter is the lamp L and 180 degrees side darker is the lamp L, however the phase angle to be phase controlled may vary according to the system scale. Here, when the phase control is executed, the waveform shows a rapid rise after the phase control, the frequency of this rise section becomes higher than the commercial frequency, and after the rise, a vibration noise is generated as shown by beta β.

Figure 12:
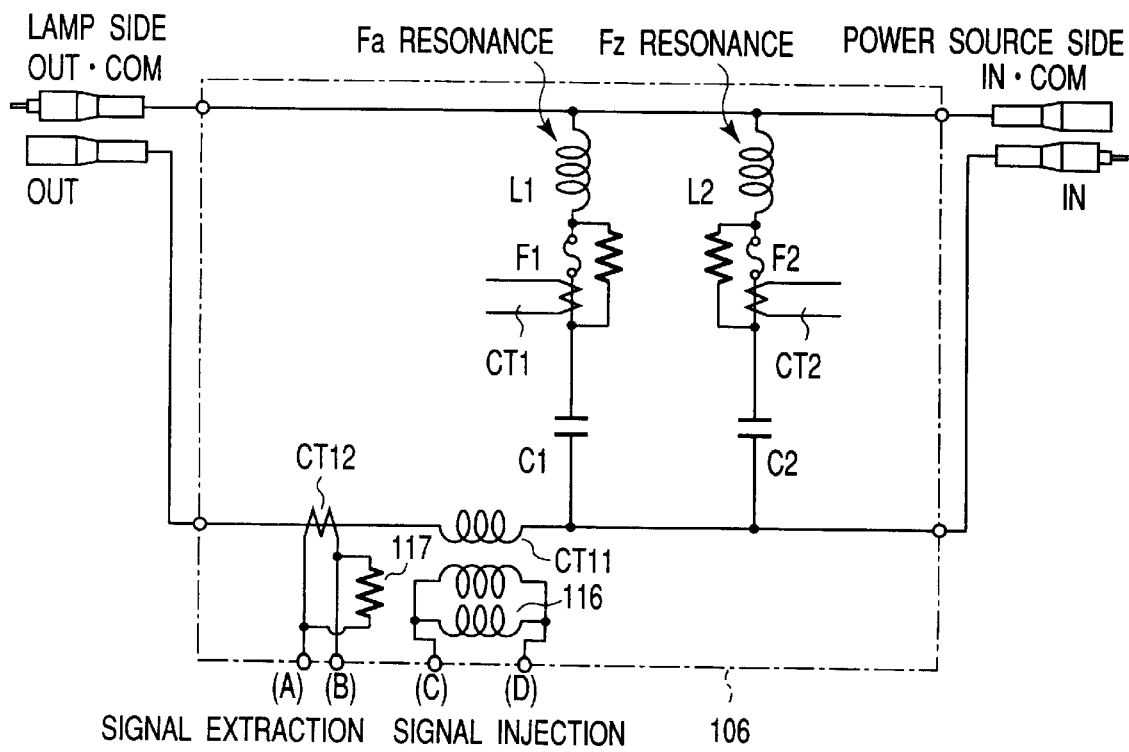
FIG. 12 is a configuration drawing showing a bypass filter apparatus inserted into the power line in the vicinity of the output side of the fixed current generator.

The filter apparatus 106 is provided with an I type LC resonance circuit for respective frequency, so as to separate a specific frequency used for power-line carrier in the host station 102 and respective terminal 109 from the fixed current generator side (power source side). For instance, in the case of FSK modulation and power-line carrier of a required signal by a power line mode composing the transmission system of the host station 102 and respective terminal 109, as two frequencies Fa, Fz are used, an I type L1/C1 resonance circuit resonating Fa and an I type L2/C2 resonance circuit resonating Fz are connected in series between power lines as shown in FIG. 12.

By the way, in the case where the aforementioned LC resonance is not operated normally, signal can not be received between the host station and the terminal; therefore, fault detection current sensor CT1, CT2 are interposed between L1 and C1, and between L2 and C3 respectively through a fuse F1, F2. The secondary side of this current sensor Ct1, and CT2 is introduced, for instance, in the host station 108 or the like. Consequently, in the case of short-circuiting of the capacitor C1, C2, a large current flow breaks the fuse F1, F2, and the current does not flow to the sensor CT1, CT2 allowing to detect the fault of the LC resonance circuit. In the case of open failure of the capacitor C1, C2 also, the fault of the concerned resonance circuit can be detected.

Figure 13:
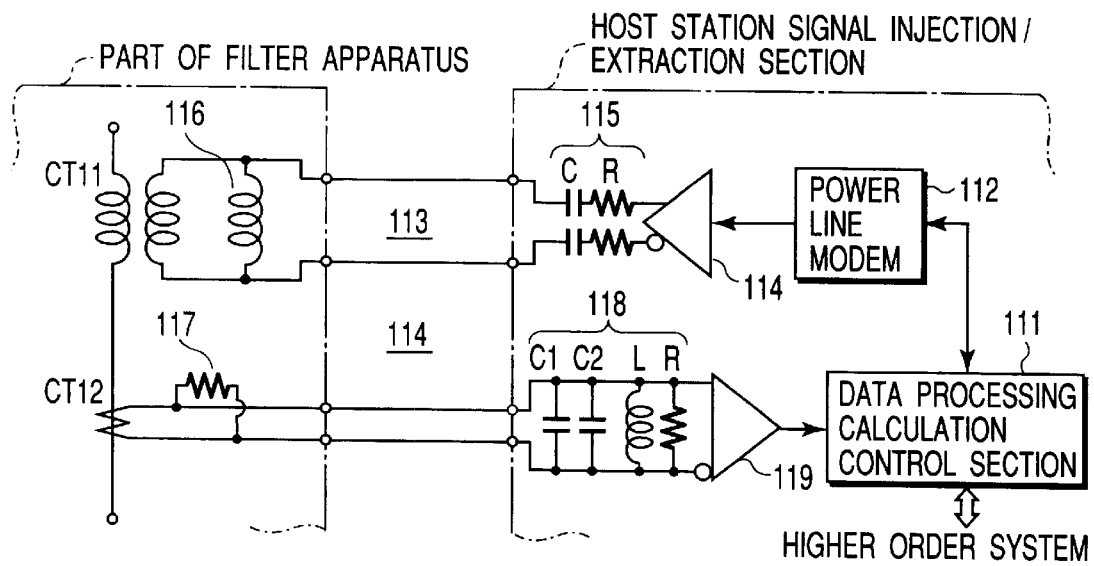
FIG. 13 is a configuration diagram showing the relation between the filter apparatus and the host station side signal injection/signal extraction.

The host station 108 is connected to a filter apparatus 106 interposed on the power line 105 through a host station dedicated transformer (CT11, CT12) 107 and, therein, a data processing calculation control section 111 constituted of CPU, a power line modem 112, a signal injection section 113 and signal extraction section 114 or the like are disposed as shown in FIG. 13.

This data processing calculation control section 111 has a function to receive a control signal for respective terminal 109 transferred from the higher order system 103, to create text data for example, and also to convert monitoring signal from respective terminal 109 into transferable data, and transfer to the higher order system 103.

The power line modem 112 receives, for instance, a predetermined timing instruction obtained from the power source waveform on the power line, and outputs a control signal, for example, converted into text data, by performing frequency shift modulation (FSK). Here, this power line modem 112 is not limited to FSK modulation using two frequencies, but it may by AM modulation, PSK modulation or tone burst method, using a single frequency.

The signal injection section 113 injects the control signal subjected to frequency shift modulation by the power line modem 112 to the power line 105 through a transmission amplification element 114, a CR resonance circuit 115, a blocking coil 116 and a transformer CT 11 in the filter apparatus 106, or the like.

The signal extraction section 114 is the one for extracting signal carried by the power line, and comprises a transformer CT12 in the filter apparatus 106, and an open protection resistor 117, for example a passive filter, a reception amplification element 119 and the like.

Figure 14:
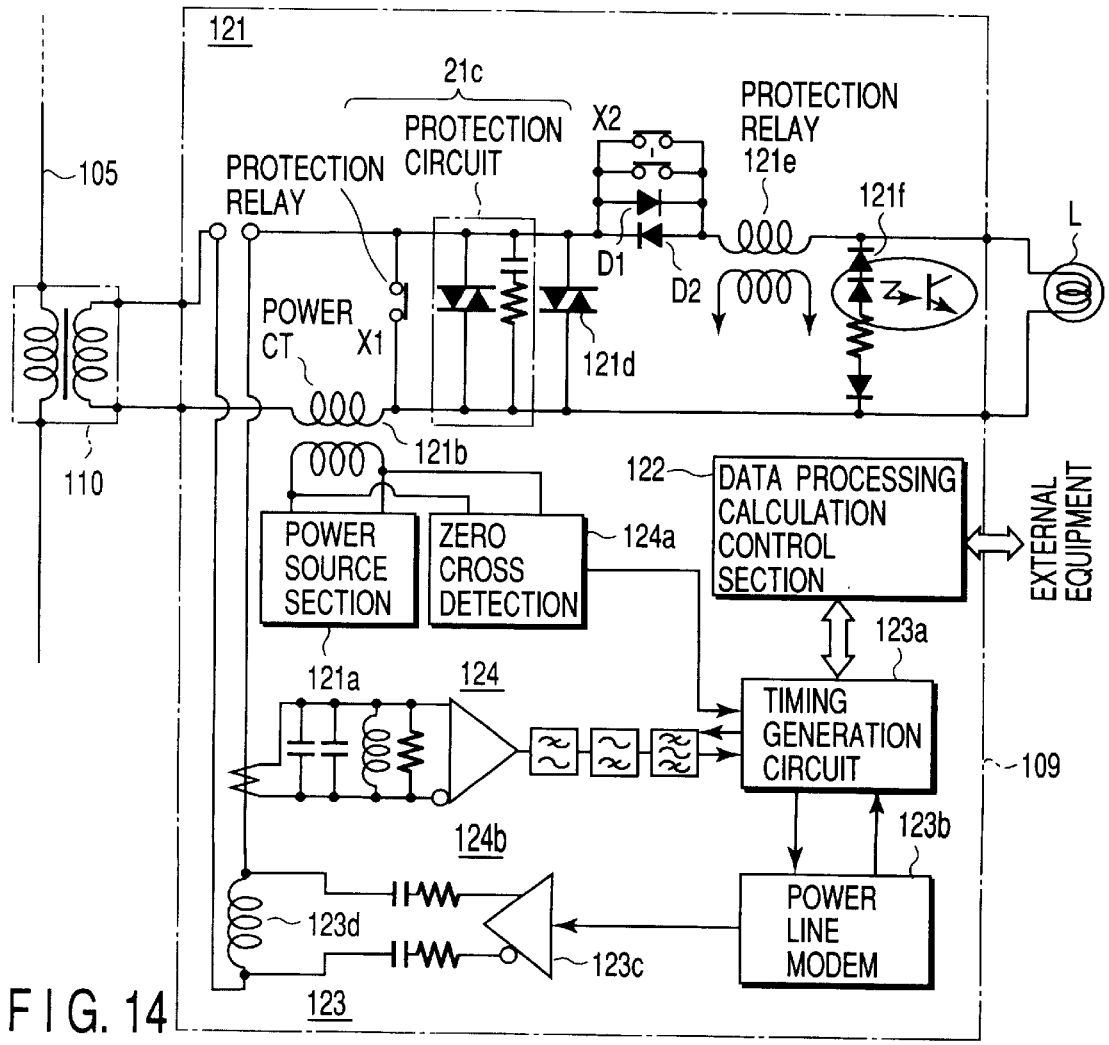
FIG. 14 is a configuration diagram of respective terminal to be connected to the power line.

The respective terminal 109 is connected to the power line 105 respectively through a rubber transformer 110 and concretely, has a configuration as shown in FIG. 14.

In short, each terminal 109 comprises a lamp power source system 121, a data processing calculation control section 122 constituted of a CPU for taking in the state of lamps L or the like connected to this lamp power source system 121 for creating a text data, for controlling the lamp L based on the text data received from the host station 108 through the power line 105, and further, for performing necessary processing according to instructions from an external equipment of input equipment, a signal injection section 123, and a signal extraction section 124.

The lamp power source system 121 comprises a power source section 121a for generating a power source for the operation of its own terminal, a current transformer 121b for taking out the power source for the operation of its own terminal, various protection circuits 121c for protecting the lamp L, an ON/OFF control section 121d such as triac for controlling the turning on/off of the lamp L, a current detection section 121e for detecting overcurrent, and a lamp filament rupture detection circuit 121f for detecting the filament burn-out of the lamp L and the like, and these detection signals are sent to the data processing calculation control section 122.

The signal injection section 123 includes a timing generation circuit 123a for taking in and outputting the text data created by the data processing calculation control section 122 at a predetermined timing after the detection of zero cross of power source waveform outputted from the fixed current generator 104, a power line modem 123b for transmitting the text data at frequency shift modulated (FSK) two specific frequency, a transmission amplification element 123c for amplifying the signal output from this power line model {modem?} 123b, and a signal injection reactance 123d for injecting signal to the power line 105.

The signal extraction section 124 is constituted of zero cross detection means including the timing generation circuit 123a detecting the zero cross of power source waveform output from the fixed current generator 104, a passive filter, a reception amplification element, an active filter such as low pass, band pass or the like, and further a timing generation circuit 123a and signal detection means 123b including a data processing calculation control section 122.

Now, the operation of the monitoring control system as mentioned above will be described referring to drawings.

First, as a general operation of monitoring control system, the monitoring control panel 102 receives lamp L and sensor C monitoring signal transferred from the host station 108, transmits to the operator console 101, and displays the operation state of lamps, or the like. In addition, the console 101 of the higher order system 103 inputs necessary control instructions from the controller, sends control signals such as lamp L turning ON/OFF control, respective terminal operation test, respective terminal reset or the like to the respective terminal 109 through the monitoring control panel 102 and the host station 108, monitors collectively the response state of this terminal side by the operator console 101 and, at the same time, performs the control.

The host station 108 is, normally, connected one by one to a single fixed current generator 104, transmits and receives signal between the higher order system 103/ respective terminal 109 and transfers necessary signal to the higher order system 103/lower order terminal 109.

In short, the host station 108, becoming the primary station, takes in control signal or the like transferred from the higher order system 103, edits to for example text data necessary for the data processing calculation control section 111, thereafter, sends to the power line modem 112 at a predetermined timing based for instance on a signal from the power line 105. This power line modem 112 FSK modulates the text data, injects into the power line 105 through the filter apparatus 106, and transfers to requiring terminal 109.

The respective terminal 109 detects the zero cross of power source waveform through the rubber transformer 110 and the power source CT21b, predicts the superposition period of the text data to be superposed to the power source waveform beforehand by the timing generation circuit 123a, takes in the text data to be superposed to the power source waveform extracted by the signal extraction section 124 during this prediction period, and sends to the data processing calculation control section 122, as shown in FIG. 14. This calculation control section 122 controls the lamp L turning on/off by controlling the ON/OFF control section 121, when it judges that the control signal is addressed to it-self from the text data.

By the way, in general, the power line circuit including the power line 105 and the rubber transformer 110 has a closed loop configuration, and the reception level of frequencies used for power-line carrier varies according to the power line connection position of the terminal as shown in FIG. 15. In short, a slow depression appears in the reception level at its reception range position according to the used frequency band. As a result, the level varies according to the position of the terminal connected to the power line 105, and the level difference between the best reception level point and the worst reception level point attains several dB to several tens of db. This is because of phasing of used frequency and existence of standing wave. Phasing means reception of transmission wave at the reception point passing through a plurality of paths, mutual cancellation or enhancement by the carrier wave phase, or reception signal fluctuation.

Next, an embodiment for reducing the influence of phasing or the like will be described.

(1) The lamp equipment of the airport or the like has specificity in the installation of the host station 108 and the respective terminal 109. In short, the host station 108 is installed at a position distal to the terminal 109, and respective terminals 109 are installed so as to form a group.

Figure 16:
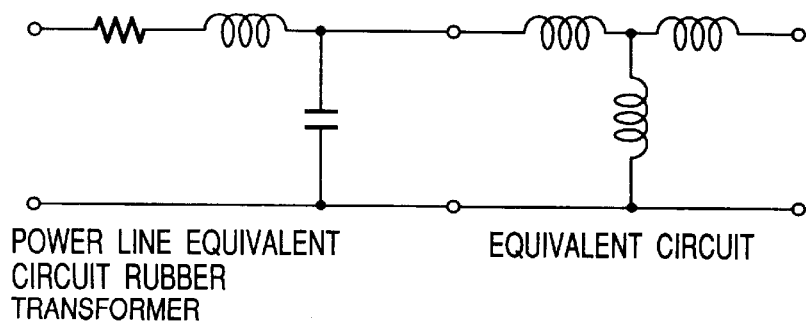
FIG. 16 represents an equivalent circuit of power line and rubber transformer.
Figure 17A:
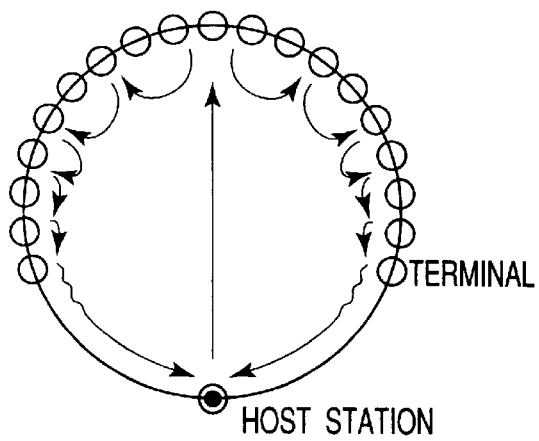
FIG. 17A and FIG. 17B illustrate the influence state of phasing or the like of the host station receiving signal from respective terminal.
Figure 17B:
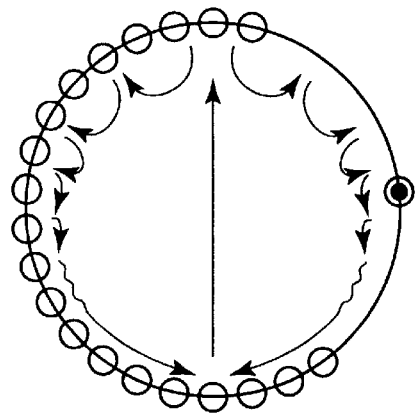

Now, an equivalent circuit of a power line circuit constituted of the power line 105 and the rubber transformer 110 can be represented as shown in FIG. 16, phasing or the like appear as shown in FIG. 17A and FIG. 17B, as they are waves reflecting from the central point of these equivalent circuits. When the host station 108 transmit a signal to the terminal 109, it becomes a transmission to a distal group as shown in FIG. 17A, and phasing affect little the respective terminal 109. On the other hand, when the terminal 109 transmits to the host station 108, it is affected considerably by the phasing, as a stand alone remote host station 108 exists in one side as shown in FIG. 17B.

Figure 18:
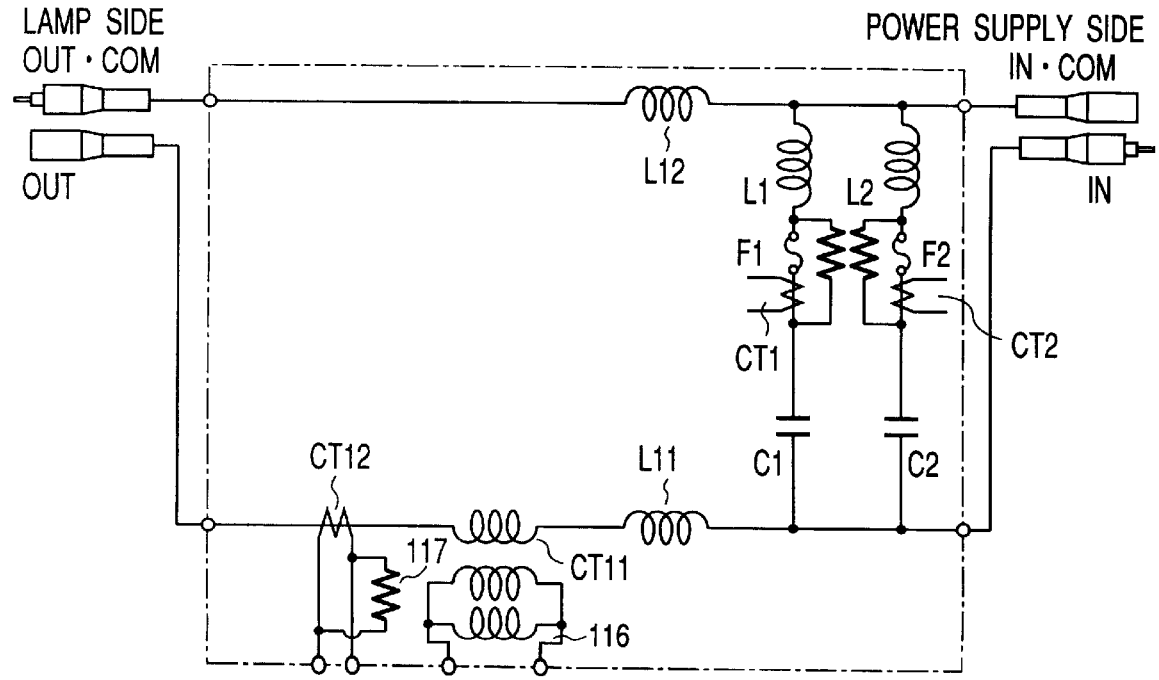
FIG. 18 is a diagram showing an example of compensation means for increasing the lamp side impedance.

There, the system of the invention intends to lower the attenuation slope of the reception level used for power-line carrier, by installing compensation reactance elements L11, L12 in the bypass filter apparatus 106 as shown in FIG. 18, and increasing the lamp side impedance, and eventually to avoid the effect of the phasing or the like and improve the transfer quality by increasing the reception level.

(2) This monitoring control system, contrives compensation means extending the distance between the power source side and the lamp side similarly in the bypass filter apparatus 106, and signal reception means by the host station 108.

Figure 19:
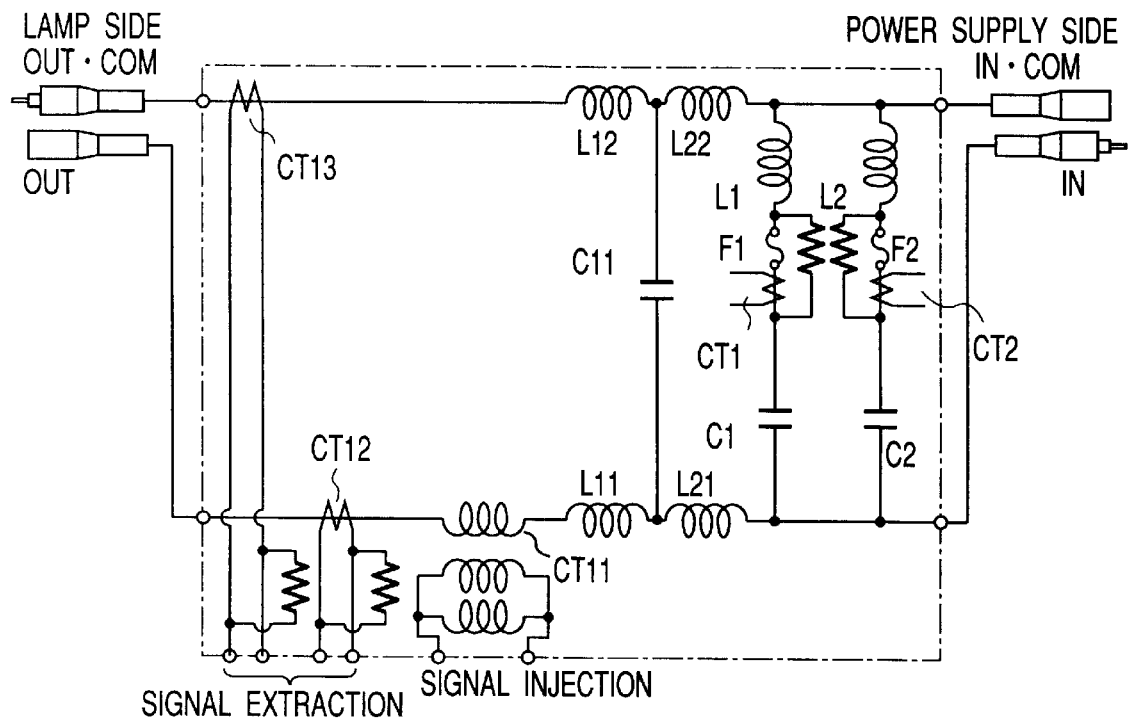
FIG. 19 is a configuration diagram illustrating the reception duplication at the host station.

To be more specific, as shown in FIG. 19, two compensation reactance elements L11, L12 are connected in series between the power source IN side line which is the one end connection end side of an I type LC resonance circuit and the host station dedicated CT composing the bypass filter apparatus 106, similarly, two compensation reactance elements L21, L22 are connected in series to the power source IN·COM side line which is the other one end connection end side of the I type LC resonance circuit, and further a compensation conductance element C11 is connected jumping between respective elements L11–L12 and elements L21–L22, and by installing a so-called H type distance prolongation compensation circuit 132, the distance of IN-OUT (F side), IN/COM-OUT/COM (R side) of the filter apparatus is increased apparently, to shift the reception point, shift the bottom due to phasing, and receive at a receivable level.

Further, the signal extraction section in the host station 108 extracts signal by a host station side CT serving as current sensor; however, the signal attenuation increases under the influence of the capacitance C between the power line—the earth, because the distance from the respective terminal 109 is far.

There, a host station dedicated CT which is signal extraction CT2, CT3 are installed at two points, power line primary side IN-OUT line, and IN·COM-OUT·COM line, the reception level of the one is lower and the reception level of the other one is made receivable by the reception duplication, so as to avoid the influence of reception level depression due to the attenuation amount.

Figure 20:
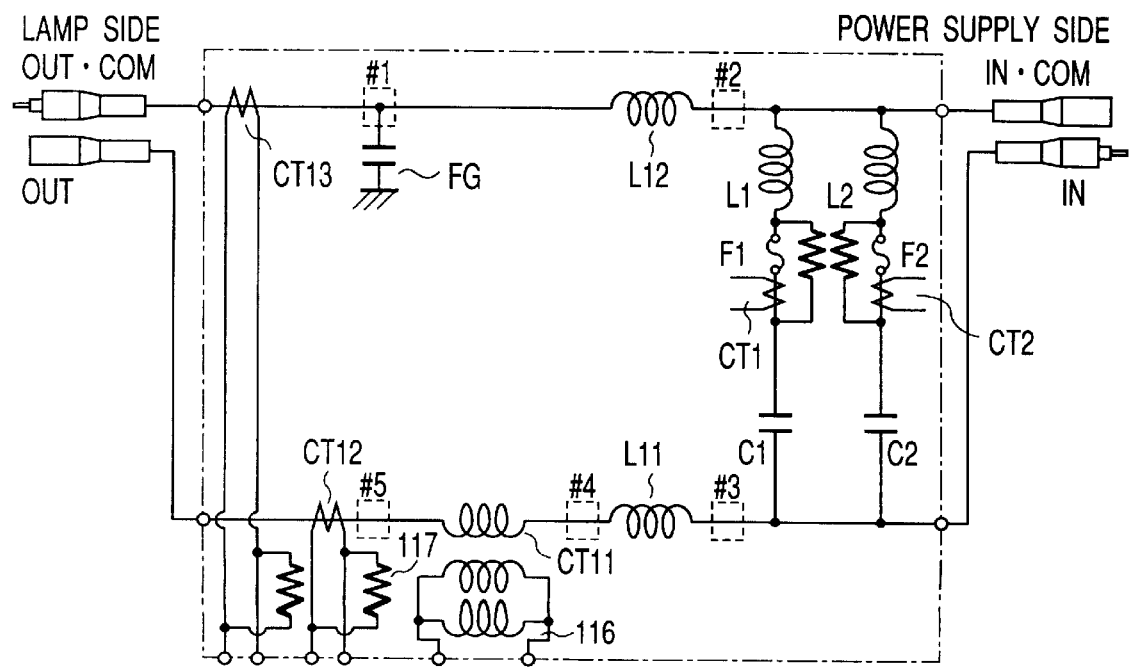
FIG. 20 is a diagram showing another example of compensation means for increasing the lamp side impedance.

In addition, as bypass filter apparatus, as shown in FIG. 20, a capacitor FG may be provided at any one of #1 to #5 in a circuit identical to FIG. 18.

Figure 21:
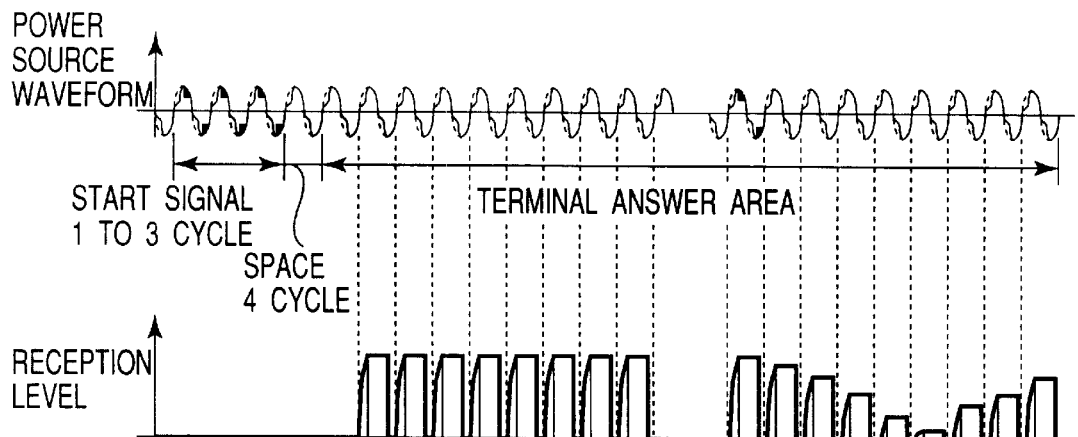
FIG. 21 is a state diagram of the reception level from respective terminal in the host station.
Figure 22:
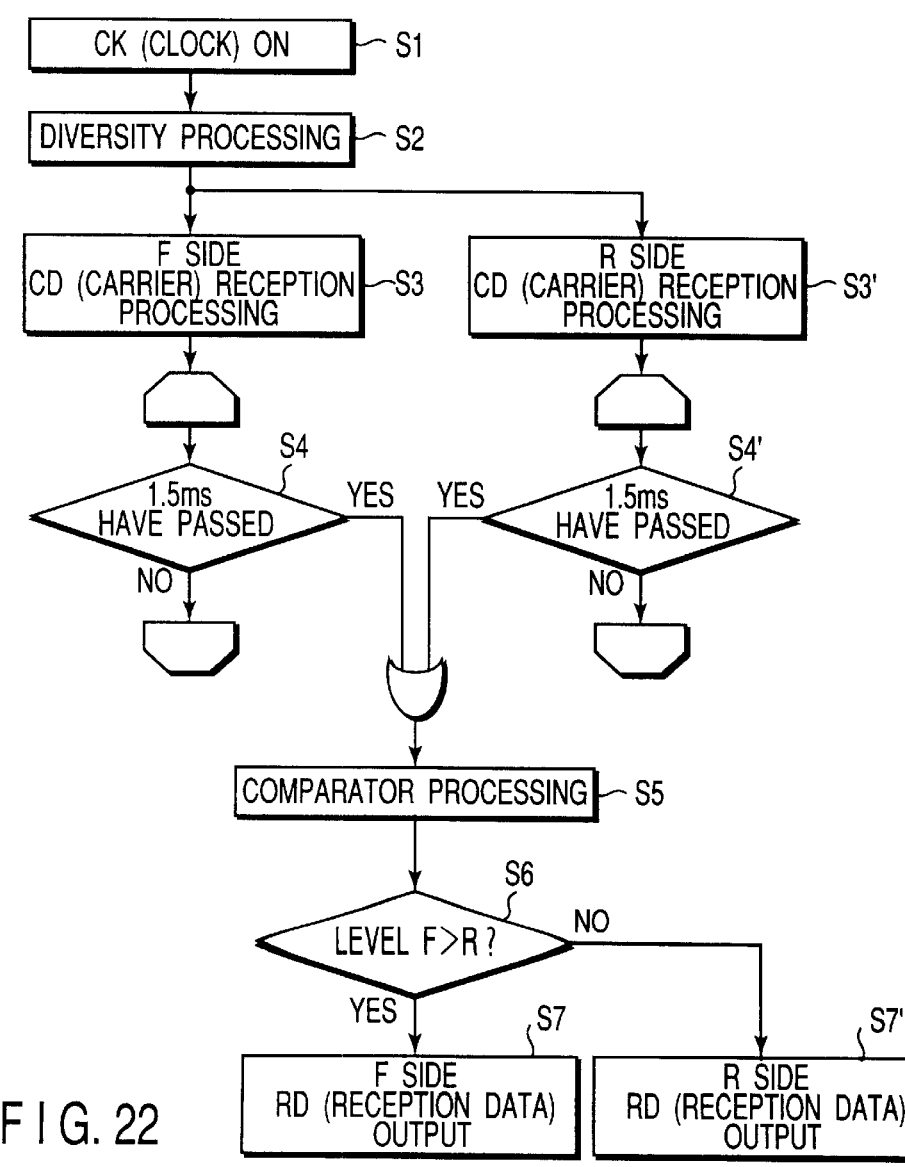
FIG. 22 is a processing flow chart of reception duplication at the host station.

FIG. 21 and FIG. 22 illustrate the reception duplication by the host station.

The host station 8 synchronize with the zero cross of power source waveform of the fixed current generator 104 based on a start signal, detects the zero cross for every half cycle/cycle of power source waveform from the start signal, and uses 1 to 4 cycle(s) as command from the host station 108+space, while the response period of respective terminal 109 to this command is allocated beforehand for each of respective power source cycle. At this time, the reception level from respective terminal 109 in the host station 108 is individually different.

There, the host station 108 receives a high level reception signal extracted from a reception system of high reception level, namely any of signal extraction CT2, CT3, through the reception duplication processing shown in FIG. 22, by monitoring the rise signal of respective terminal at all times. In short, the data processing calculation control section 111 in the host station 108, performs the diversity processing (S2) taking in power-line carrier reception signals simultaneously from respective signal extraction sections corresponding to a plurality of Ct, CT2, based on the reception clock on by the zero cross detection of power source waveform (S1), performs the reception processing including filter processing of these taken in reception signals (S3, S3'), judges respectively whether for instance 1.5 ms (90 degrees from the zero cross of power source waveform) have passed or not (S4, S3'), compares F side level and R side level by the comparator processing of both reception signals when 1.5 ms have passed (S5, S6), takes in the signal extracted by the signal extraction section of F side signal if F side level is higher, and on the contrary takes in the signal extracted by the signal extraction section of R side signal if R side level is higher, and outputs the same (S7, S7').

Figure 23:
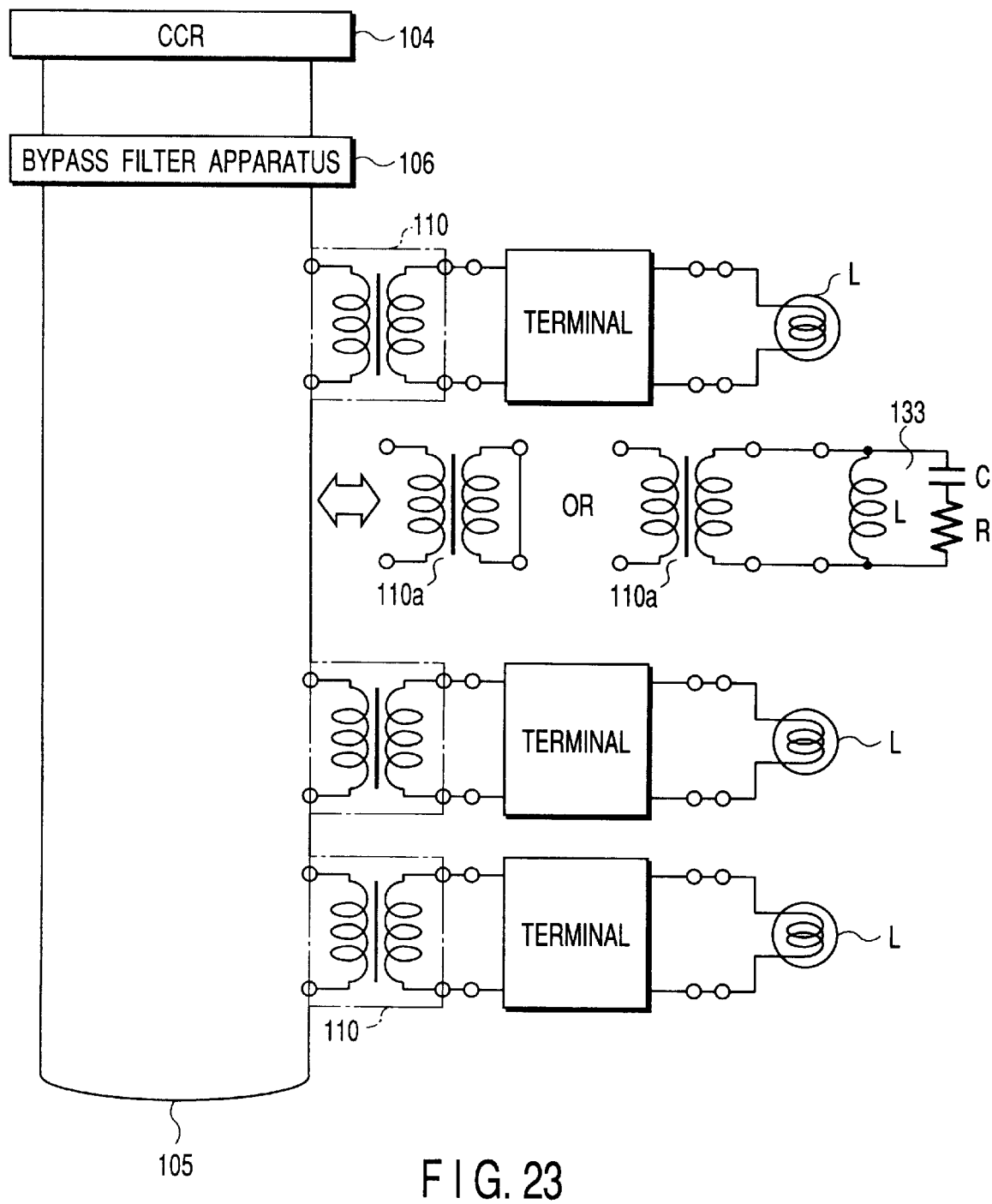
FIG. 23 is a configuration diagram compensating the reception level depression at the terminal.

On the other hand, in respective terminal 109 side, compensation means as shown in FIG. 23 is installed.

In other words, in the terminal 109, the influence of phasing is certainly low, some decrease of the reception level still exists. Especially, according to the lamp construction state of the power line 105, in the case where they are distant from the adjacent lamp, the signal attenuated considerably under the influence of the capacitance between the power line–the earth.

There, as the reception become impossible at the terminal 109 connected to a place of the power line 105 where the reception level drops most, the reception level depression position is shifted by additionally inserting one rubber transformer 110a to the place, allowing to receive the reception signal at the reception level of little depression in the concerned terminal 109.

Here, the secondary side of the added rubber transformer 110a is short-circuited, in the case when for instance a LC resonance circuit 133 resonating the frequency used for power-line carrier is connected, the reception level depression can be eliminated by resonating with the used frequency by the LC.

Figure 24:
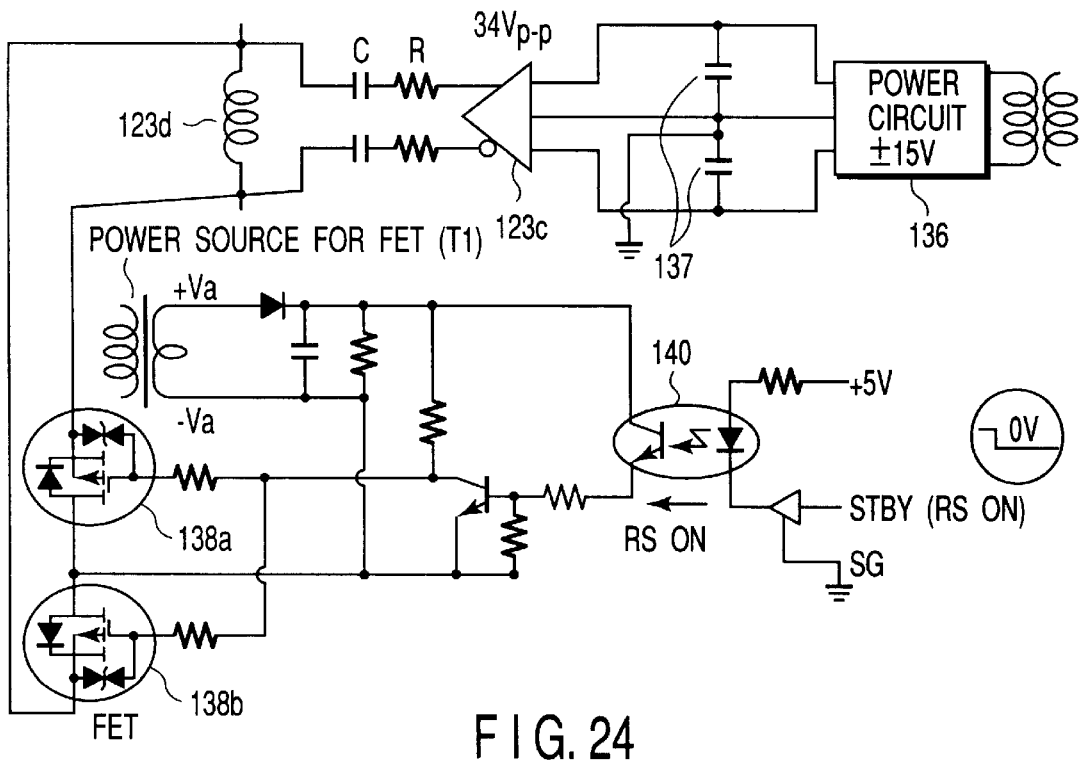
FIG. 24 is a configuration diagram showing an embodiment of power economy out of signal transmission period of time in respective terminal.

FIG. 24 is a configuration diagram showing another embodiment of the signal injection section in respective terminal 109.

The higher is the signal transmission level from respective terminal 109, the higher is the communication quality. There, in this configuration, a power source charge capacitor 137 is installed at the output side of the power source circuit 136 constituted as a part of the power line modem 123b, power necessary for the transmission is accumulated in the capacitor 137 per se during signal non transmission period, and for example a FSK modulated signal is transmitted consuming the accumulated power during the transmission.

On the other hand, the respective terminal 109 is connected to both extremities of the signal injection reactance 123d respectively through FET138a, 138b as shown in FIG. 24, and so long as the signal injection reactance 123d is connected in series with the rubber transformer 110, power is consumed uselessly. Therefore, useless power consumption can be avoided by short-circuiting the both extremities of the signal injection reactance 123d for instance by FET138a, 138b, during the non transmission period. 139 is a FET power source, 140 is control signal generation means for controlling ON/OFF of FET 138a, 138b.

Figure 25:
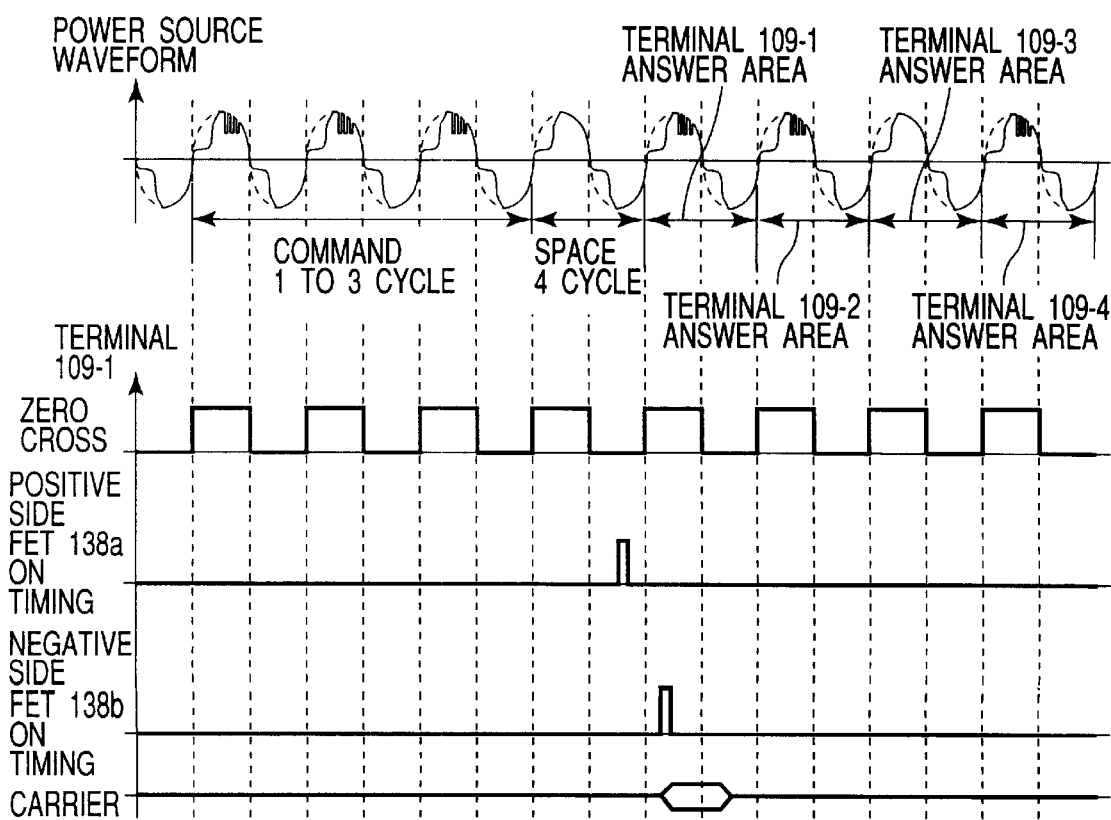
FIG. 25 illustrates the power economy out of signal transmission period and the timing in the signal transmission period in respective terminal.

FIG. 25 illustrates the timing of FET 138a, 138b in the signal injection section 123 of respective terminal 109.

Namely, the host station 108 detects the zero cross of power source waveform, power-line carries command data to respective terminal 109 using 1 to 3 cycle(s), thereafter, after having installed a space of power source waveform 1 cycle, the answer period of respective terminal to this host station command is previously allocated for each respective power source cycle.

Here, in respect of the terminal 109-1, the positive side FET 138a is short-circuited on this side of the answer area of its own station, and the negative side FET 138b is short-circuited at the time point past the zero cross. By doing so, the generation of overvoltage at both extremities of the reactance can be prevented beforehand, by connecting suddenly a signal injection reactance 123d when the signal is injected.

As mentioned above, the present invention allows to reduce the influence of noise generated from the fixed current generator, ensure a high quality transfer, even for a power-line carrier of lower transfer quality, and further, realize the whole system at a low cost by using the power-line carrier.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for monitoring and controlling airport facilities having at least one of a plurality of lamps, said system comprising:

a plurality of terminals connected in series to a power line derived from a fixed current generator, for monitoring individually said airport facilities via a rubber transformer; and a host station connected to a higher order system of said airport facilities, for transmitting control signals to each of said terminals using a power-line carrier of said power line based on a signal from said higher order system and the monitoring signal to said host station using the power-line carrier of said power line, wherein each of said host station and said terminals comprises:

zero cross detection means for detecting the zero cross of power source waveform of said power line;

a data processing calculation control section for creating a control command for respective terminals and a monitoring signal of the airport facilities as text data; and signal insertion means for inserting said text data into said power line by a predetermined modulation based on the zero cross detected by said zero cross detection means, and wherein said host station comprises means for creating a first text data based on said control command, and inserting the text data into said power line by using zero crosses of a plurality of cycles of said power source waveform; and said respective terminals comprise means for creating second text data, which is a monitoring signal of the airport facilities, each of said terminal being allocated to each cycle of said power source waveform, and for inserting said second text data into said power line using the zero cross of a predetermined cycle of said power source waveform, after the reception of said first text data power line carried from said host station, when a communication between said host station and said plurality of terminals is to be performed.

2. The power-line carrier airport facilities monitor system, according to claim 1, wherein said signal intersection means comprises means for inserting said text data into said power line when a predetermined time has elapsed in the same cycle, after the zero cross detection by said zero cross detection means.

3. The power-line carrier airport facilities monitor system according to claim 1 or claim 2, wherein:

the host station has a display element connected via a current transformer to a bypass filter provided between power lines derived from said fixed current generator, and the status of said bypass filter is monitored by the display status of this display element.

4. The power-line carrier airport facilities monitor system according to claim 1 or claim 2, wherein:

said respective terminal is provided with a power accumulation element for accumulating power of the power source section used at least for the lamp, and the power accumulated in this a power accumulation element is used at least during the signal injection by said signal injection means.

5. The power line carrier airport facilities monitor system according to claim 1, wherein said signal insertion means comprises means for inserting said text data into said power line when a predetermined time has elapsed in the same cycle, after the zero cross detection by said zero cross detection means.

6. A system for monitoring and controlling airport facilities having at least one of a plurality of lamps, said system comprising:

a plurality of terminals connected in series to a power line derived from a fixed current generator, for monitoring individual said airport facilities via a rubber transformer are connected in series to a power line derived from a fixed current generator;

a host station connected to a higher order system of said airport facilities, for transmitting control signals to each of said terminals using the power-line carrier of said power line based on a signal from said higher order system the monitoring signal to said host station using power-line carrier of said power line;

a filter apparatus comprising a resonance circuit resonating with the frequency used for said power-line carrier is provided on the output side power line of said fixed current generator, such that noise generated from said fixed current generator and signal of the frequency used for said power-line carrier between said host station and each terminal are respectively separated, wherein said filter apparatus comprises compensation reactance elements for increasing respectively said host station/respective terminal side impedance, installed at the power line primary said positioned at said host station/respective terminal side in said resonance circuit, in order lower the attenuation slope of the frequency used for the power-line carrier due to phasing or standing wave.

7. The power-line carrier facilities monitor system according to claim 6, wherein said host stations comprises a plurality of signal extraction sensors installed at the power line primary side positioned at said host station/respective terminal side than said LC resonance circuit in said bypass filter apparatus, in order to taking in as reception signal the signal extraction sensor side extraction signal presenting a higher reception level.

8. The power-line carrier facilities monitor system according to claim 6, wherein an additional rubber transformer is connected to said power line on this side of a specific terminal presenting a deeper depression of reception level, among terminals connected to said power line, in order to avoid the reception level depression at said specific terminal.

9. The power-line carrier facilities monitor system according to claim 6, wherein an additional rubber transformer is connected to said power line on this side of a specific terminal presenting a deeper depression of reception level, among terminals connected to said power line, and a resonance circuit resonating with the frequency used for the power-line carrier at the secondary side of the connected additional rubber transformer, in order to avoid the reception level depression at said specific terminal.

10. A system for monitoring and controlling airport facilities having at least one of a plurality of lamps, said system comprising:

a plurality of terminals connected in series to a power line derived from fixed current generator, for monitoring individually said airport facilities via a rubber transformer;

a host station connected to a higher order system of said airport facilities, for transmitting control signals to each of said terminals using a power-line carrier of said power line based on a signal from said higher order system and the monitoring signal to said host station using the power-line carrier of said power line; and a filter apparatus comprising a resonance circuit resonating with the frequency used for said power-line carrier provided on the output side power line of said fixed current generator, such that noise generated from said fixed current generator and signal of the frequency used for said power-line carrier between said host station and each terminal are respectively separated, said terminal being provided with a power charging capacitor for charging power to the output side of a power line modem out of a signal injection period, when a signal is injected into said power line from the power line modem through a signal injection reactance, and a switching element for short-circuiting and signal injection reactance during said out of signal injection period, in order to increase the transmission power using said charged power during signal injection.

11. A system for monitoring and controlling airport facilities having at least one of a plurality of lamps, said system comprising:

a plurality of terminals connected in series to a power line derived from a fixed current generator for monitoring individually said airport facilities via a rubber transformer;

a host station connected to a higher order system of said airport facilities, for transmitting control signals to each of said terminals using power-line carrier of said power line based on a signal from said higher order system and the monitoring signal to said host station using power-line carrier of said power line; and a filter apparatus comprising a resonance circuit resonating with the frequency used for said power-line carrier provided on the output side power line of said fixed current generator, such that noise generated from said fixed current generator and signal of the frequency used for said power-line carrier between said host station and each terminal are respectively separated, said switching element connects in said signal injection reactance before a predetermined time of the power source waveform to inject a signal, in order to avoid generation of over voltage by the signal injection reactance.

* * * * *

UNITED STATES PATENT AND TRADEMARK OFFICE
CERTIFICATE OF CORRECTION

PATENT NO. : 6,437,686 B2  Page 1 of 1
DATED : August 20, 2002
INVENTOR(S) : Satoh et al.

It is certified that error appears in the above-identified patent and that said Letters Patent is hereby corrected as shown below:

Column 17,
Line 43, "terminal" should read -- terminals --.

Column 18,
Line 2, before "power accumulation element", delete "a".
Line 22, after "system", insert -- and --.
Line 35, "in order lower" should read -- in order to lower --.
Line 39, "host stations comprises" should read -- host station comprises --.
Line 43, "to taking in" should read -- to take in --.
Line 65, after "derived from", insert -- a --.

Signed and Sealed this

Twenty-seventh Day of May, 2003

JAMES E. ROGAN
*Director of the United States Patent and Trademark Office*